US006944703B2

(12) United States Patent
Okaue et al.

(10) Patent No.: US 6,944,703 B2
(45) Date of Patent: Sep. 13, 2005

(54) ELECTRONIC DEVICE, INFORMATION PROCESSING DEVICE, ADAPTER DEVICE, AND INFORMATION EXCHANGE SYSTEM

(75) Inventors: Takumi Okaue, Tokyo (JP); Junko Sasaki, Tokyo (JP)

(73) Assignee: Sony Corporation (JP)

( * ) Notice: Subject to any disclaimer, the term of this patent is extended or adjusted under 35 U.S.C. 154(b) by 14 days.

(21) Appl. No.: 10/362,635

(22) PCT Filed: Jun. 26, 2002

(86) PCT No.: PCT/JP02/06441

§ 371 (c)(1),
(2), (4) Date: Jul. 25, 2003

(87) PCT Pub. No.: WO03/009222

PCT Pub. Date: Jan. 30, 2003

(65) Prior Publication Data

US 2004/0030808 A1 Feb. 12, 2004

(30) Foreign Application Priority Data

Jun. 28, 2001 (JP) ...................................... 2001-197150

(51) Int. Cl.[7] .............................................. G06F 13/00
(52) U.S. Cl. ...................................... 710/301; 711/115
(58) Field of Search ......................... 710/301; 711/115, 711/103

(56) References Cited

U.S. PATENT DOCUMENTS 5,648,929 A    7/1997  Miyamoto
6,219,768 B1 *  4/2001  Hirabayashi et al. ........ 711/154
6,266,724 B1 *  7/2001  Harari et al. ................ 710/301
6,282,611 B1 *  8/2001  Hamamoto et al. .......... 711/115
6,330,634 B1 * 12/2001  Fuse et al. ................... 711/103
6,601,140 B1 *  7/2003  Okaue et al. ................ 711/115
6,601,151 B1 *  7/2003  Harris ......................... 711/158
6,792,539 B1 *  9/2004  Oishi et al. .................. 713/194

FOREIGN PATENT DOCUMENTS

EP    1 043 729 A2   10/2000
JP       64-39555 U    3/1989
JP     8-263361 A1    10/1996
JP    2000-353226 A1  12/2000

* cited by examiner

Primary Examiner—Kim Huynh
Assistant Examiner—Harold Kim
(74) Attorney, Agent, or Firm—Lerner, David, Littenberg, Krumholz & Mentlik, LLP

(57) ABSTRACT

An electronic device, information processing device, and adapter device enabling smooth internal circuit switching and other operations are provided. In the electronic device 200, the serial interface 21 and parallel interface 22 are connected via a data bus 23 to the register 24 and data buffer 25, and this data buffer 25 is connected to an ECC circuit 26. The register 24, data buffer 25 and ECC circuit 26 are connected to the memory 28 via a memory interface and sequencer circuit 27. The register 24 is connected to the controller 29, and data input and output is controlled. The interfaces 21 and 22 are switched by means of control signals from this controller 29. That is, switching between these interfaces 21 and 22 is performed through discrimination, by the controller 29, of a portion of the data written to the register 24.

67 Claims, 16 Drawing Sheets

FIG. 3

| Pin No. | Pin Name | I/O | Application of Each Pin | |
|---|---|---|---|---|
| | | | Serial Transfer | Parallel Transfer |
| 1 | VSS | I/O | Power Supply (Vss) | |
| 2 | BS | I | | Protocol Bus State |
| 3 | DATA1 | I/O | High Impedance | Data 1 |
| 4 | SDIO/DATA0 | I/O | Serial Data | Data 0 |
| 5 | DATA2 | I/O | High Impedance | Data 2 |
| 6 | INS | O | Insertion Det. | |
| 7 | DATA3 | I/O | High Impedance | Data 3 |
| 8 | SCLK | I | Clock | |
| 9 | VCC | I | Power Supply (Vcc) | |
| 10 | VSS | | Power Supply (Vss) | |

FIG. 4

| Address | Read Register | Write Register |
|---|---|---|
| 00 | | |
| 01 | Interrupt | |
| 02 | Status | |
| 03 | | |
| 04 | Type Number | Type Number |
| 05 | Access Identification | Access Identification |
| 06 | Category Number | Category Number |
| 07 | Class Number | |
| 08 | | |
| 09 | Undefined | Undefined |
| ≀ | ≀ | ≀ |
| 0F | Undefined | |
| 10 | System Parameter | System Parameter |
| 11 | | Page Count 1 |
| 12 | | Page Count 0 |
| 13 | | Page Address 3 |
| 14 | | Page Address 2 |
| 15 | | Page Address 1 |
| 16 | | Page Address 0 |
| 17 | | TPC Parameter |
| 18 | | CMD Parameter |
| 19 | Format Being Formulated | Format Being Formulated |
| ≀ | ≀ | ≀ |
| 1F | Format Being Formulated | Format Being Formulated |
| 20 | | |
| ≀ | ≀ | ≀ |
| FD | Inhibit Parameter | Inhibit Parameter |
| ≀ | ≀ | ≀ |
| FF | | |

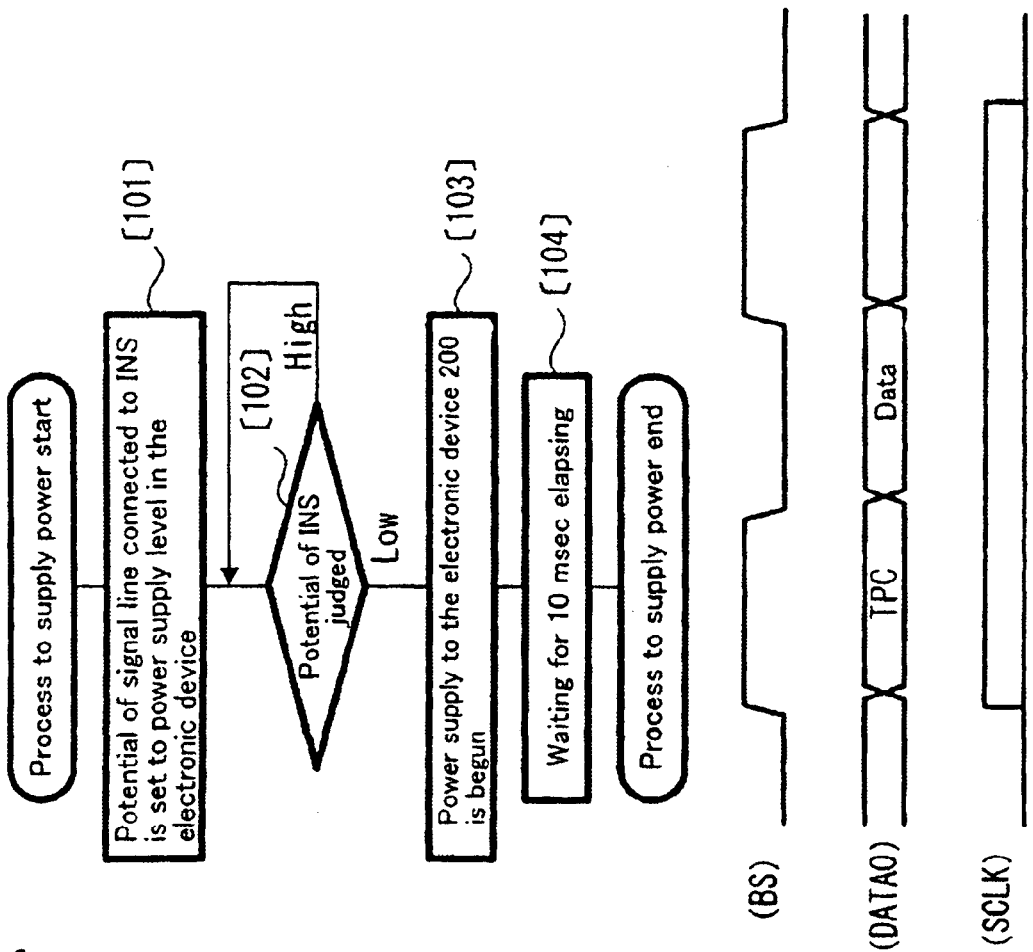

FIG. 8

| 06h | 04h | 05h | 02h | Type/Device/Function |
|---|---|---|---|---|
| Other than 00h/FFh | 00h/FFh | 00h/FFh | Ignored | Type 1 Expansion Device Not Comprising Memory Functions |
| Other than 00h/FFh | 01h | 00h/FFh | Ignored | Type 2 Expansion Device Not Comprising Memory Functions |
| 00h/FFh | 00h/FFh | 00h/FFh | xxxxxxx1b | Type 1 Memory Device (Writing Forbidden) or Type 1 Expansion Device Having Memory Functions (Writing Forbidden) |
| 00h/FFh | 00h/FFh | 00h/FFh | xxxxxxx0b | Type 1 Memory Device or Type 1 Expansion Device Having Memory Functions |
| 00h/FFh | 01h | 01h | xxxxxxx1b | Type 2 Memory Device (Writing Forbidden) or Type 2 Expansion Device Having Memory Functions (Writing Forbidden) |
| 00h/FFh | 01h | 01h | xxxxxxx0b | Type 2 Memory Device or Type 2 Expansion Device Having Memory Functions |

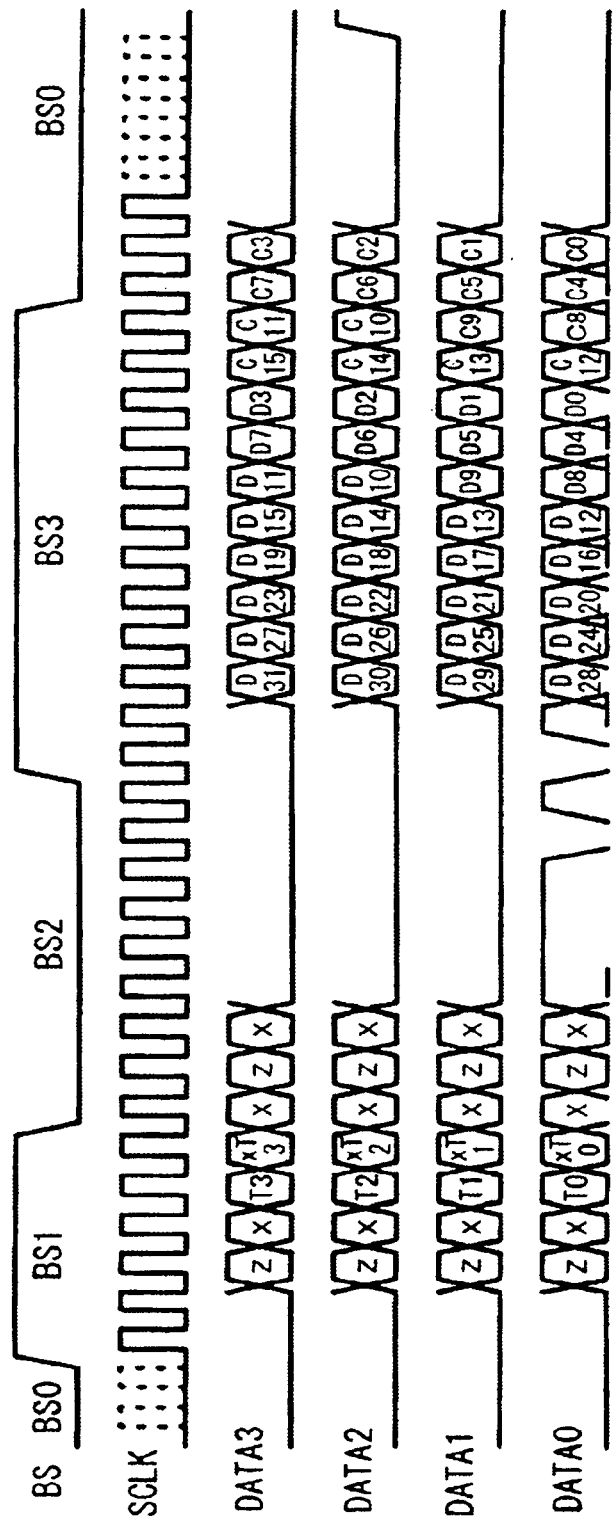

| Type | Category | Class | Explanation of Classification |
|---|---|---|---|
| 00h, FFh | 00h, FFh | 00h, FFh | Type 1 Memory Card (Without Logical/Physical Conv. Function) or Type 1 Memory Card ROM (Without Logical/Physical Conv. Function) |
| | | 01h | Type 1 Memory Card ROM (Without Logical/Physical Conv. Function) |
| | | 02h | Type 1 Memory Card R (Without Logical/Physical Conv. Function) |
| | | 03h | Different Type 1 Memory Card (e.g. Containing Memory Other than Flash Memory & Without Logical/Physical Conv. Function) |
| | | 04h-FEh | Type Error |
| | 01h-7Fh | 00h-FFh | Type 1 Memory Card IO Expanded Module (Without Logical/Physical Conv. Function) |
| | 80h-Feh | 00h-FFh | Type Error |
| 01h | 00h, FFh | 00h, FFh | Type 2 Memory Card (With Internal Logical/Physical Conv. Function) or Type 2 Card ROM (With Internal Logical/Physical Conv. Function) |
| | | 01h | Type 2 Memory Card ROM (With Internal Logical/Physical Conv. Function) |
| | | 02h | Type 2 Memory Card R (With Internal Logical/Physical Conv. Function) |
| | | 03h | Different Type 2 Memory Card (e.g. Containing Memory Other than Flash Memory & With Internal Logical/Physical Conv. Function) |
| | | 04h-7Fh | Type Error |
| | | 80h | Type 2 Memory Card (Without Logical/Physical Conv. Function) or Type 2 Memory Card ROM (With Internal Logical/Physical Conv. Function) |
| | | 81h | Type 2 Memory Card ROM (Without Logical/Physical Conv. Function) |
| | | 82h | Type 2 Memory Card R (Without Logical/Physical Conv. Function) |
| | | 83h | Different Type 2 Memory Card (e.g. Containing Memory Other than Flash Memory & Without Logical/Physical Conv. Function) |
| | | 84h-FFh | Type Error |
| | 01h-7Fh | 00h-7Fh, FFh | Type 2 Memory Card IO Expanded Module (With Internal Logical/Physical Conv. Function) |
| | | 08h-83h | Type 2 Memory Card IO Expanded Module (Without Logical/Physical Conv. Function) |
| | 80h-FFh | 00h-FFh | Type Error |

ELECTRONIC DEVICE, INFORMATION PROCESSING DEVICE, ADAPTER DEVICE, AND INFORMATION EXCHANGE SYSTEM

TECHNICAL FIELD

This invention relates to an electronic device, for example detachably provided in an information processing device, which performs an arbitrary function; an information processing device which employs this electronic device; an adapter device which performs intervening information exchange therebetween as necessary; and, an information exchange system employing any of these. In particular, this invention relates to an electronic device, having a shape similar to that of for example a memory card device or a similar semiconductor memory device, and which is connected with the connection portions of these devices to execute memory functions or other arbitrary functions, as well as to an information processing device, adapter device, or information exchange system relating to this electronic device.

BACKGROUND ART

An electronic device is proposed, having a shape similar to that of, for example, a memory card detachably provided in an information processing device, or a semiconductor memory device similar to this, and which is connected to a memory device or other connection portion of the information processing device to execute memory functions or other arbitrary functions. That is, by for example integrating this electronic device with memory functions or endowing the device with separate computer network connection functions or communication functions, the operation and application of the information processing device can be easily expanded.

Such electronic devices are based on, for example, an electronic device which executes memory functions previously proposed by this applicant, or which executes other arbitrary functions, and which employs serial transfer for input and output of data. On the other hand, in order to transfer larger amounts of data in shorter periods of time, there is a need to perform data input and output using parallel transfer. However, it is not easy for an electronic device based on serial transfer for the input and output of data to employ parallel transfer for data input and output.

In other words, the above-described electronic device is based on data input and output performed by serial transfer, and so in order to perform data input/output by parallel transfer, switching of internal circuitry or similar is necessary. Also, in the information processing device also, the mounted electronic device must be recognized and the internal circuitry switched. However, it is not easy to perform such identification and internal circuitry switching; and in conventional electronic devices and information processing devices, such identification and switching are not generally performed.

Further, an adapter device provided between the electronic device and the information processing device is implemented. In such an adapter device, a function is implemented to perform conversion between parallel transfer and serial transfer, between for example an electronic device and an information processing device. In such an adapter device also, it is necessary to stop conversion between parallel transfer and serial transfer and otherwise perform switching to accommodate, for example, the above-described electronic device which performs data input/output using parallel transfer; however, it is not easy to recognize an electronic device and perform switching, and in the prior art such identification and switching has not been implemented.

The present invention was devised in light of these points; as the problems to be solved thereby, it is not easy to perform identification of electronic devices and switching of internal circuitry, and in conventional electronic devices, information processing devices, adapter devices and information exchange systems, such identification and switching has not been implemented.

DISCLOSURE OF THE INVENTION

The first claim of this invention is an electronic device, detachably provided in an information processing device, having a card-shaped housing comprising a plurality of terminals, input/output means having a function for data input/output by serial transfer and a function for data input/output by parallel transfer, and a register comprising a prescribed write area and read area and in which are stored settings indicating the functions of the electronic device itself; and wherein a prescribed value, indicating that the input/output means has a function for input/output of data by serial transfer and a function for input/output of data by parallel transfer, is stored at a prescribed address of the register.

By this means, an electronic device of this invention enables identification of the electronic device by simple means, and this can be used to very smoothly perform internal circuit switching and other operations.

According to the second claim of this invention, a prescribed value, indicating that the input/output means has both a function for input/output of data by serial transfer and a function for input/output of data by parallel transfer, is stored in the register, and by sending the prescribed value stored in the register to the information processing device via the input/output means, in response to a register read instruction from the information processing device, internal circuitry switching and other operation can be performed satisfactorily.

According to the third claim of this invention, the input/output means can reliably and without malfunction perform serial transfer and parallel transfer operations based on settings from the information processing device, by deciding whether to execute the data input/output function by serial transfer or to execute the data input/output function by parallel transfer.

According to the fourth claim of this invention, in the initial state the data input/output function by serial transfer is executed, the data input/output function by parallel transfer is executed when a prescribed identification bit in the write area of the register is changed, and when the prescribed identification bit in the register write area is returned to its original value, the data input/output function by serial transfer is executed; by this means, switching between serial transfer and parallel transfer can be performed reliably and without malfunction.

According to the fifth claim of this invention, a memory function is provided, an address conversion function is incorporated which performs conversion between logical addresses of data for processing and physical addresses for the memory function, and a prescribed code is recorded at a prescribed address in the register indicating the incorporation of the address conversion function; by this means, internal circuitry switching and other operation can be performed reliably without malfunction, and data transfer can be performed at high speed.

According to the sixth claim of this invention, a memory function is provided, a plurality of types of memory functions are stipulated for memory functions, and a prescribed code indicating a memory function type is recorded at a prescribed address of the register; by this means, internal circuitry switching and other operations can be performed reliably and without malfunction, and in addition, operations on numerous memory types can be performed.

The seventh claim of this invention is an electronic device, detachably provided in an information processing device, having a card-shaped housing comprising a plurality of terminals, a register comprising a prescribed write area and read area and in which are stored settings indicating the functions of the electronic device itself, and an address conversion function to perform conversion between logical addresses of data for processing and physical addresses for memory functions; and wherein a prescribed value, indicating the incorporation of the address conversion function, is stored at a prescribed address of the register.

By this means, an electronic device of this invention enables identification of the electronic device by simple means, and this can be used to very smoothly perform internal circuit switching and other operations, as well as performing data transfer at high speed.

According to the eighth claim of this invention, the electronic device has input/output means which has a function for data input/output by serial transfer and a function for data input/output by parallel transfer; by storing, at a prescribed address in the register, a prescribed value indicating that the input/output means has a function for data input/output by serial transfer and a function for data input/output by parallel transfer, internal circuitry switching of data input/output functions between serial transfer and parallel transfer, and other operations, can be performed satisfactorily.

According to the ninth claim of this invention, the electronic device has input/output means which has a function for data input/output by serial transfer and a function for data input/output by parallel transfer; by storing in the register a prescribed value indicating that the input/output means has both a function for data input/output by serial transfer and a function for data input/output by parallel transfer, and by sending the prescribed value stored in the register to the information processing device via the input/output means in response to a register read instruction from the information processing device, internal circuitry switching and other operations can be performed satisfactorily.

According to the tenth claim of this invention, the electronic device has input/output means which has a function for data input/output by serial transfer and a function for data input/output by parallel transfer; by deciding, based on settings from the information processing device, whether to execute the function for data input/output by serial transfer or to execute the function for data input/output by parallel transfer, serial transfer and parallel transfer operations can be performed reliably and without malfunction.

According to the eleventh claim of this invention, the electronic device has input/output means which has a function for data input/output by serial transfer and a function for data input/output by parallel transfer; by executing the function for data input/output by serial transfer in the initial state, as well as executing the function for data input/output by parallel transfer when a prescribed identification bit in the write area of the register is modified, and executing the data input/output function by serial transfer when the prescribed identification bit in the write area is returned to the original value, switching between serial transfer and parallel transfer can be performed reliably and without malfunction.

According to the twelfth claim of this invention, a memory function is provided, a plurality of types of memory functions are stipulated, and a prescribed code indicating a memory function type is recorded at a prescribed address of the register; by this means, internal circuitry switching and other operations can be performed reliably and without malfunction, and in addition, operations on numerous memory types can be performed.

The 13th claim of this invention is an information processing device which performs input and output of data to and from a detachable electronic device, having control means to read a value in a register comprised by the electronic device and recognize a setting indicating a function of the electronic device; the control means reads a setting in a register of the electronic device and judges whether the input/output means of the electronic device has both a function for data input/output by serial transfer and a function for data input/output by parallel transfer.

By this means, an information processing device of this invention can identify an electronic device using simple means, and employing this, internal circuitry switching and other operations can be performed extremely smoothly.

According to the 14th claim of this invention, when the setting in the register of an electronic device indicates that the input/output means of the electronic device has only a function for data input/output by serial transfer, the control means recognizes this electronic device as a first electronic device, and when the setting in the register of an electronic device indicates that the input/output means of the electronic device has both a function for data input/output by serial transfer and a function for data input/output by parallel transfer, the control means recognizes this electronic device as a second electronic device, and consequently can reliably and without malfunction perform circuit switching and other operations.

According to the 15th claim of this invention, the information processing device has transmission means which, when the control means judges that the input/output means of the electronic device has both a function for data input/output by serial transfer and a function for data input/output by parallel transfer, transmits an instruction to the electronic device to decide whether to execute the function for data input/output by serial transfer or the function for data input/output by parallel transfer, so that serial transfer and parallel transfer operations can be performed reliably and without malfunction.

According to the 16th claim of this invention, when the control means judges that the input/output means of the electronic device has both a function for data input/output by serial transfer and a function for data input/output by parallel transfer, in the initial state the function for data input/output by serial transfer is executed, when the function for data input/output by parallel transfer is to be executed a prescribed identification bit in the write area of the register is changed, and when data input/output by serial transfer is to be performed, the prescribed identification bit in the write area of the register is returned to the original value; consequently switching between serial transfer and parallel transfer can be performed reliably and without malfunction.

According to the 17th claim of this invention, an address conversion function is incorporated which performs conversion between logical addresses for processing of data and physical addresses for memory functions, and moreover, when a prescribed code indicating that the electronic device has an address conversion function to convert between logical addresses for processing of data and physical addresses for memory functions is written at a prescribed address in the register, the incorporated address conversion function is rendered inactive; consequently circuit switching and other operations can be reliably performed without malfunction, and moreover data transfer can be performed at high speed.

According to the 18th claim of this invention, a plurality of types of memory functions in electronic devices are stipulated, and when a prescribed code indicating a memory function type is written at a prescribed address in the register, processing is performed according to the memory function type; by this means circuit switching and other operations can be performed reliably and without malfunction, and moreover operations on various types of memory can be performed.

A 19th claim of this invention is an information processing device which performs data input and output to and from a detachable electronic device, having control means which reads a value in a register comprised by the electronic device and recognizes a setting indicating a function of the electronic device; the control means reads a setting in the register of the electronic device, and judges whether the electronic device incorporates an address conversion function which performs conversion between logical addresses for information processing and physical addresses for the electronic device.

By means of an information processing device of this invention, an electronic device can be identified using simple means, and this can be employed to perform internal circuitry switching and other operations extremely smoothly; moreover, data transmission can be performed at high speed.

According to the 20th claim of this invention, when the setting in the register indicates that the electronic device incorporates an address conversion function to convert between logical addresses for information processing and physical addresses for memory functions in the electronic device, the control means recognizes this electronic device as a first electronic device, and when the setting in the register indicates that the electronic device does not incorporate an address conversion function to convert between logical addresses for information processing and physical addresses for memory functions in the electronic device, the control means recognizes this electronic device as a second electronic device, and consequently can reliably and without malfunction perform circuit switching and other operations.

According to the 21st claim of this invention, the control means reads a setting in the register of the electronic device, and judges whether the input/output means of the electronic device has both a function for data input/output by serial transfer and a function for data input/output by parallel transfer, and moreover, when the setting in the register of the electronic device indicates that the input/output means of the electronic device has only a function for data input/output by serial transfer, the control means recognizes the electronic device as a first electronic device, and when the setting in the register of the electronic device indicates that the input/output means of the electronic device has both a function for data input/output by serial transfer and a function for data input/output by parallel transfer, the control means recognizes the electronic device as a second electronic device. Consequently switching of internal circuitry for data input/output by serial transfer and by parallel transfer and other operations can be performed satisfactorily.

According to the 22nd claim of this invention, the control means has a transmission means which, in cases where the control means reads a setting in the register of the electronic device and judges whether the input/output means of the electronic device has a function for data input/output by serial transfer and a function for data input/output by parallel transfer, and judges that the input/output means of the electronic device has both a function for data input/output by serial transfer and a function for data input/output by parallel transfer, transmits an instruction to decide whether to execute data input/output by serial transfer or data input/output by parallel transfer for an electronic device; by this means, serial transfer and parallel transfer can be performed reliably and without malfunction.

According to the 23rd claim of this invention, the control means reads a setting in the register of the electronic device and judges whether the input/output means of the electronic device has a function for data input/output by serial transfer and a function for data input/output by parallel transfer, and in cases where it is judged that the input/output means of the electronic device has both a function for data input/output by serial transfer and a function for data input/output by parallel transfer, in the initial state the control means executes the function for data input/output by serial transfer, modifies a prescribed identification bit in the write area of the register when the function for data input/output by parallel transfer is to be executed, and returns the prescribed identification bit in the write area of the register to the original value when the function for data input/output by serial transfer is to be performed; by this means, switching between serial transfer and parallel transfer can be performed reliably and without malfunction.

According to the 24th claim of this invention, a plurality of types of memory functions in an electronic device are stipulated, and when a prescribed code indicating a memory function type is written at a prescribed address of the register, processing is performed according to the memory function type; by this means, circuit switching and other operations can be performed reliably and without malfunction, and operations on numerous memory types can be performed.

The 25th claim of this invention is an adapter device, provided between an electronic device detachably provided in an information processing device and the information processing device which performs data input/output with the electronic device, and which reads a value in a register comprised by the electronic device, and has control means to recognize settings indicating functions of the electronic device; the control means reads a setting in the register of the electronic device and judges whether the input/output means of the electronic device has both a function for data input/output by serial transfer and a function for data input/output by parallel transfer.

By means of an adapter device of this invention, an electronic device can be identified using simple means, and this can be employed to perform internal circuitry switching and other operations extremely smoothly.

According to the 26th claim of this invention, when the setting in the register of the electronic device indicates that the input/output means of the electronic device has only a function for data input/output by serial transfer, the control means recognizes the electronic device as a first electronic device, and when the setting in the register of the electronic device indicates that the input/output means of the electronic device has both functions for data input/output by serial transfer and for data input/output by parallel transfer, the control means recognizes the electronic device as a second electronic device; by this means, circuit switching and other operations can be performed reliably and without malfunction.

According to the 27th claim of this invention, the adapter device has transmission means which, when the control means judges that the input/output means of the electronic device has both a function for data input/output by serial transfer and a function for data input/output by parallel transfer, transmits an instruction to the electronic device which decides whether to execute the function for data input/output by serial transfer or to execute the function for data input/output by parallel transfer; and by this means, serial transfer and parallel transfer operation can be performed reliably and without malfunction.

According to the 28th claim of this invention, when the control means judges that the input/output means of the electronic device has both a function for data input/output by serial transfer and a function for data input/output by parallel transfer, in the initial state the function for data input/output by serial transfer is executed; when the function for data input/output by parallel transfer is to be executed, a prescribed identification bit in the write area of the register is changed; and when the function for data input/output by serial transfer is to be performed, the prescribed bit in the write area of the register is returned to its original value. By this means, switching between serial transfer and parallel transfer can be performed reliably and without malfunction.

According to the 29th claim of this invention, an address conversion function is incorporated which performs conversion between logical addresses for data processing and physical addresses for memory functions in the electronic device, and moreover, when prescribed code is written at a prescribed address in the register indicating that the electronic device has an address conversion function to convert between logical addresses for data processing and physical addresses for memory functions, the incorporated address conversion function is rendered inactive; by this means, circuit switching and other operations can be performed reliably and without malfunction, and moreover data transfer can be performed at high speed.

According to the 30th claim of this invention, a plurality of types of memory functions in an electronic device are stipulated, and when prescribed code is written at a prescribed address in the register indicating the type of memory function, processing is performed according to the type of memory function; by this means, circuit switching and other operations can be performed reliably and without malfunction, and moreover operations on numerous memory types can be performed.

According to the 31st claim of this invention, when a setting in the register indicates that an address conversion function to convert between logical addresses for information processing and physical addresses for memory functions in the electronic device is incorporated into the electronic device, the control means recognizes the electronic device as a first electronic device, and when a setting in the register indicates that there is no address conversion function in the electronic device to convert between logical addresses for information processing and physical addresses for memory functions in the electronic device, the control means recognizes the electronic device as a second electronic device; by this means, circuit switching and other operations can be performed reliably and without malfunction.

The 32nd claim of this invention is an adapter device, provided between an electronic device detachably provided in an information processing device and the information processing device which performs data input/output with the electronic device, and which reads a value in a register comprised by the electronic device, and has control means to recognize settings indicating functions of the electronic device; the control means reads a setting in the register of the electronic device and judges whether the electronic device incorporates an address conversion function to convert between logical addresses for information processing and physical addresses in the electronic device.

By means of an adapter device of this invention, an electronic device can be identified using simple means, and this can be employed to perform internal circuitry switching and other operations extremely smoothly, and moreover data transfer can be performed at high speed.

According to the 33rd claim of this invention, when the setting in the register indicates that the electronic device incorporates an address conversion function to convert between logical addresses for information processing and physical addresses for memory functions in the electronic device, the control means recognizes this electronic device as a first electronic device, and when the setting in the register indicates that the electronic device does not incorporate an address conversion function to convert between logical addresses for information processing and physical addresses for memory functions in the electronic device, the control means recognizes this electronic device as a second electronic device; by this means, circuit switching and other operations can be performed reliably and without malfunction.

According to the 34th claim of this invention, the control means reads the setting in the register of the electronic device and judges whether the input/output means of the electronic device has both a function for data input/output by serial transfer and a function for data input/output by parallel transfer, and moreover, when the setting in the register of the electronic device indicates that the input/output means of the electronic device has only a function for data input/output by serial transfer, recognizes this electronic device as a first electronic device, and when the setting in the register of the electronic device indicates that the input/output means of the electronic device has both a function for data input/output by serial transfer and a function for data input/output by parallel transfer, recognizes this electronic device as a second electronic device; by this means, switching of internal circuitry of the functions for data input/output by serial transfer and for data input/output by parallel transfer and other operations can be performed satisfactorily.

According to the 35th claim of this invention, the control means has transmission means which, when the control means reads the setting in the register of the electronic device and judges whether the input/output means of the electronic device has both a function for data input/output by serial transfer and a function for data input/output by parallel transfer, if the control means judges the input/output means of the electronic device to have both a function for data input/output by serial transfer and a function for data input/output by parallel transfer, transmits to the electronic device an instruction which decides whether to execute the function for data input/output by serial transfer or to execute the function for data input/output by parallel transfer; and by this means, serial transfer and parallel transfer operations can be performed reliably and without malfunction.

According to the 36th claim of this invention, when the control means reads the setting in the register of the electronic device and judges whether the input/output means of the electronic device has both a function for data input/ output by serial transfer and a function for data input/output by parallel transfer, if the control means judges the input/ output means of the electronic device to have both a function for data input/output by serial transfer and a function for data input/output by parallel transfer, in the initial state the function for data input/output by serial transfer is executed; if the function for data input/output by parallel transfer is to be executed, the control means changes a prescribed identification bit in the write area of the register; and if data input/output by serial transfer is to be performed, the control means returns the prescribed identification bit in the write area of the register to the original value. By this means, switching between serial transfer and parallel transfer can be performed reliably and without malfunction.

According to the 37th claim of this invention, a plurality of types are stipulated for memory functions in an electronic device, and when a prescribed code indicating a type of memory function is written at a prescribed address of the register, processing corresponding to the type of memory function is performed; by this means, circuit switching and other operations can be performed reliably and without malfunction, and moreover operations can be performed on numerous memory types.

The 38th claim of this invention is an information exchange system, comprising an information processing device and an electronic device provided so as to enable attachment to and detachment from the information processing device; the information processing device discriminates whether a register is provided in the electronic device having a prescribed write area and read area, in which is stored a setting indicating the functions of the electronic device; if a register is not provided, the information processing device recognizes the electronic device as a first electronic device comprising only memory functions, and if a register is provided, the information processing device reads a setting stored in the register and recognizes the electronic device as a second electronic device comprising functions other than memory functions, and also identifies the functions executed by the electronic device according to the setting stored in the register.

By means of an information exchange system of this invention, an electronic device can be identified using simple means, and this can be employed to perform internal circuit switching and other operations extremely smoothly.

According to the 39th claim of this invention, when a register is provided in the electronic device, an instruction to read the register is sent from the information processing device to the electronic device, and by reading from the register, via input/output means, a prescribed value stored in the register which identifies whether the input/output means has both a function for data input/output by serial transfer and a function for data input/output by parallel transfer, circuit switching and other operations can be performed reliably and without malfunction.

According to the 40th claim of this invention, when a register is provided in the electronic device, an instruction is sent from the information processing device to the electronic device which decides whether to execute the function for data input/output by serial transfer or to execute the function for data input/output by parallel transfer; and by this means, serial transfer and parallel transfer operations can be performed reliably and without malfunction.

According to the 41st claim of this invention, in the initial state the function for data input/output by serial transfer is executed; when the function for data input/output by parallel transfer is to be executed, a prescribed identification bit in the write area of the register is changed; and when data input/output by serial transfer is to be performed, the prescribed identification bit in the write area of the register is returned to the original value. By this means, switching between serial transfer and parallel transfer can be performed reliably and without malfunction.

According to the 42nd claim of this invention, an address conversion function which converts between logical addresses for information processing and physical addresses for memory functions in the electronic device is incorporated in the electronic device, and moreover a prescribed code indicating that the address conversion function is incorporated is written at a prescribed address in the register; by this means, circuit switching and other operations can be performed reliably and without malfunction, and moreover data transfer can be performed at high speed.

According to the 43rd claim of this invention, an address conversion function which converts between logical addresses for information processing and physical addresses for memory functions in the electronic device is incorporated in the information processing device, and moreover when a prescribed code indicating that the electronic device has an address conversion function is written at a prescribed address in the register, the address conversion function incorporated in the information processing device is rendered inactive; by this means circuit switching and other operations can be performed reliably and without malfunction, and data transfer can be performed at high speed.

According to the 44th claim of this invention, a plurality of types of memory functions in an electronic device are stipulated, and when a prescribed code indicating a memory function type is written at a prescribed address in the register, processing corresponding to the memory function type is performed; by this means, circuit switching and other operations can be performed reliably and without malfunction, and operations on numerous types of memory can be performed.

According to the 45th claim of this invention, an address conversion function to convert between logical addresses for data processing and physical addresses for memory functions in the electronic device is incorporated in the electronic device, and when a prescribed code is provided at a prescribed address in the register indicating that a function for data input/output by parallel transfer is provided, the incorporated address conversion function is employed; by this means circuit switching and other operations can be performed reliably and without malfunction.

According to the 46th claim of this invention, an address conversion function to convert between logical addresses for data processing and physical addresses for memory functions in the electronic device is incorporated in the information processing device, and when a prescribed code indicating that a function for data input/output by parallel transfer is provided is not written at the prescribed address in the register, the incorporated address conversion function is employed; by this means, circuit switching and other operations can be performed reliably and without malfunction, and moreover data transfer by parallel transfer can be performed at high speed.

The 47th claim of this invention is an information exchange system, comprising an information processing device and an electronic device provided so as to enable attachment to and detachment from the information processing device, having control means which reads a value in a register comprised by the electronic device and recognizes a setting indicating a function of the electronic device; the control means reads a setting in the register of the electronic device, and judges whether an address conversion function, to convert between logical addresses for information processing and physical addresses in the electronic device, is incorporated within the electronic device.

By means of the information exchange system of this invention, an electronic device can be identified using simple means, and this can be employed to perform internal circuit switching and other operations extremely smoothly; moreover, data transfer can be performed at high speed.

According to the 48th claim of this invention, when the setting in the register indicates that an address conversion function to convert between logical addresses for information processing and physical addresses for memory functions in the electronic device is incorporated in the electronic device, the control means recognizes the electronic device as a first electronic device, and when the setting in the register indicates that an address conversion function to convert between logical addresses for information processing and physical processes for memory functions in the electronic device is not incorporated in the electronic device, the control means recognizes the electronic device as a second electronic device; by this means, internal circuit switching and other operations can be performed satisfactorily.

According to the 49th claim of this invention, the control means reads the setting in the register of the electronic device and judges whether the input/output means of the electronic device has both a function for data input/output by serial transfer and a function for data input/output by parallel transfer, and moreover, when the setting in the register of the electronic device indicates that the input/output means of the electronic device has only a function for data input/output by serial transfer, recognizes the electronic device as a first electronic device, and when the setting in the register of the electronic device indicates that the input/output means of the electronic device has both a function for data input/output by serial transfer and a function for data input/output by parallel transfer, recognizes the electronic device as a second electronic device; by this means, internal circuit switching of functions for data input/output by serial transfer and by parallel transfer and other operations can be performed satisfactorily.

According to the 50th claim of this invention, the control means has transmission means which, when the control means reads the setting in the register of the electronic device and judges whether the input/output means of the electronic device has both a function for data input/output by serial transfer and a function for data input/output by parallel transfer, if the input/output means of the electronic device is judged to have both a function for data input/output by serial transfer and a function for data input/output by parallel transfer, transmits an instruction to the electronic device to decide whether to execute the function for data input/output by serial transfer or to execute the function for data input/output by parallel transfer; by this means, serial transfer and parallel transfer operations can be performed reliably and without malfunction.

According to the 51st claim of this invention, the control means reads the setting in the register of the electronic device and judges whether the input/output means of the electronic device has both a function for data input/output by serial transfer and a function for data input/output by parallel transfer, and moreover, when the control means judges that the input/output means of the electronic device has both a function for data input/output by serial transfer and a function for data input/output by parallel transfer, in the initial state the control means executes the function for data input/output by serial transfer; when the function for data input/output by parallel transfer is to be executed, the control means changes a prescribed identification bit in the write area of the register; and when data input/output by serial transfer is to be performed, the control means returns the identification bit in the write area of the register to the original value. By this means, switching between serial transfer and parallel transfer can be performed reliably and without malfunction.

According to the 52nd claim of this invention, a plurality of types of memory functions in an electronic device are stipulated, and when a prescribed code indicating a type of memory function is written at a prescribed address in the register, processing corresponding to the memory function type is performed; by this means, circuit switching and other operations can be performed reliably and without malfunction, and in addition operations on numerous memory types can be performed.

The 53rd claim of this invention is an information exchange system, comprising an information processing device, an electronic device provided so as to enable attachment to and detachment from the information processing device, and an adapter device, in which the information processing means judges whether a register is provided in the electronic device, having a prescribed write area and read area, and in which is stored a setting indicating electronic device functions; when a register is not provided, the information processing device recognizes the electronic device as a first electronic device comprising only memory functions, when a register is provided, the information processing device recognizes the electronic device as a second electronic device comprising functions other than memory functions, and the information processing device identifies the functions executed by the electronic device according to the setting stored in the register.

By means of the information exchange system of this invention, an electronic device can be identified using simple means, and this can be employed to perform internal circuit switching and other operations extremely smoothly.

According to the 54th claim of this invention, when a register is provided in the electronic device, a register read instruction is sent to the electronic device from the information processing device, and a prescribed value stored in the register is read from the register via the input/output means identifying whether the input/output means has both a function for data input/output by serial transfer and a function for data input/output by parallel transfer; by this means, circuit switching and other operations can be performed reliably and without malfunction.

According to the 55th claim of this invention, when a register is provided in the electronic device, an instruction is sent from the information processing device to the electronic device to decide whether the input/output means should execute a function for data input/output by serial transfer or should execute a function for data input/output by parallel transfer; by this means, serial transfer and parallel transfer operations can be performed reliably and without malfunction.

According to the 56th claim of this invention, in the initial state the function for data input/output by serial transfer is executed; when the function for data input/output by parallel transfer is to be executed, a prescribed identification bit in the write area of the register is changed; and when data input/output by serial transfer is to be performed, the prescribed identification bit in the write area of the register is returned to the original value. By this means, switching between serial transfer and parallel transfer can be performed reliably and without malfunction.

According to the 57th claim of this invention, an address conversion function to convert between logical addresses for information processing and physical addresses for memory functions in the electronic device is incorporated into the electronic device, and a prescribed code indicating the incorporation of the address conversion function is written at a prescribed address of the register; by this means, circuit switching and other operations can be performed reliably and without malfunction, and moreover data transfer can be performed at high speed.

According to the 58th claim of this invention, an address conversion function to convert between logical addresses for information processing and physical addresses for memory functions in the electronic device is incorporated into the information processing device, and in addition, when a prescribed code is written at a prescribed address in the register indicating that the electronic device has an address conversion function to convert between logical addresses for information processing and physical addresses for memory functions, the incorporated address conversion function is rendered inactive; by this means, circuit switching and other operations can be performed reliably and without malfunction.

According to the 59th claim of this invention, an address conversion function to convert between logical addresses for information processing and physical addresses for memory functions in the electronic device is incorporated into the adapter device, and in addition, when a prescribed code is written at a prescribed address in the register indicating that the electronic device has an address conversion function to convert between logical addresses for information processing and physical addresses for memory functions, the incorporated address conversion function is rendered inactive; by this means, circuit switching and other operations can be performed reliably and without malfunction, and moreover data transfer can be performed at high speed.

According to the 60th claim of this invention, a plurality of types of memory functions in an electronic device are stipulated, and when a prescribed code indicating a memory function type is written at a prescribed address in the register, processing is performed according to the memory function type; by this means circuit switching and other operations can be performed reliably and without malfunction, and moreover operations on numerous memory types can be performed.

According to the 61st claim of this invention, an address conversion function to convert between logical addresses for information processing and physical addresses for memory functions in the electronic device is incorporated into the electronic device, and when a prescribed code is provided at a prescribed address of the register indicating that a function for data input/output by parallel transfer is provided, the incorporated address conversion function is employed; by this means, circuit switching and other operations can be performed reliably and without malfunction.

According to the 62nd claim of this invention, an address conversion function to convert between logical addresses for information processing and physical addresses for memory functions in the electronic device is incorporated into the information processing device, and when a prescribed code indicating that a function for data input/output by parallel transfer is provided is not provided at a prescribed address of the register, the incorporated address conversion function is employed; by this means, circuit switching and other operations can be performed reliably and without malfunction, and moreover data transfer when using parallel transfer can be performed at high speed.

According to the 63rd claim of this invention, an address conversion function to convert between logical addresses for information processing and physical addresses for memory functions in the electronic device is incorporated into the adapter device, and when a prescribed code indicating that a function for data input/output by parallel transfer is provided is not provided at a prescribed address of the register, the incorporated address conversion function is employed; by this means, circuit switching and other operations can be performed reliably and without malfunction, and moreover data transfer when using parallel transfer can be performed at high speed.

The 64th claim of this invention is an information exchange system, comprising an information processing device, an electronic device provided so as to enable attachment to and detachment from the information processing device, and an adapter device, having control means which reads a register comprised by the electronic device and recognizes a setting indicating functions of the electronic device; the control means reads a setting in the register of the electronic device and judges whether an address conversion function to convert between logical addresses for information processing and physical addresses in the electronic device is incorporated within the electronic device.

By means of this information exchange system, an electronic device can be identified using simple means, and this can be employed to perform internal circuit switching and other operations extremely smoothly, as well as performing data transfer using parallel transfer at high speed.

According to the 65th claim of this invention, when the setting in the register indicates that an address conversion function to convert between logical addresses for information processing and physical addresses for memory functions in the electronic device is incorporated within the electronic device, the control means recognizes the electronic device as a first electronic device, and when the setting in the register indicates that an address conversion function to convert between logical addresses for information processing and physical addresses for memory functions in the electronic device is not incorporated within the electronic device, the control means recognizes the electronic device as a second electronic device; by this means internal circuit switching and other operations can be performed satisfactorily, and moreover data transfer using parallel transfer can be performed at high speed.

According to the 66th claim of this invention, the control means reads the setting in the register of the electronic device and judges whether the input/output means of the electronic device has both a function for data input/output by serial transfer and a function for data input/output by parallel transfer; when the setting in the register of the electronic device indicates that the input/output means of the electronic device has only a function for data input/output by serial transfer, recognizes the electronic device as a first electronic device; and when the setting in the register of the electronic device indicates that the input/output means of the electronic device has both a function for data input/output by serial transfer and a function for data input/output by parallel transfer, recognizes the electronic device as a second electronic device. By this means, switching of internal circuits for functions for data input/output by serial transfer and by parallel transfer and other operations can be performed satisfactorily, and in addition data transfer using parallel transfer can be performed at high speed.

According to the 67th claim of this invention, the control means has transmission means which, when the control means reads the setting in the register of the electronic device and judges whether the input/output means of the electronic device has both a function for data input/output by serial transfer and a function for data input/output by parallel transfer, if the control means jusges that the input/output means of the electronic device has both a function for data input/output by serial transfer and a function for data input/output by parallel transfer, transmits to the electronic device an instruction to decide whether to execute the function for data input/output by serial transfer or to execute the function for data input/output by parallel transfer; by this means, serial transfer and parallel transfer operations can be performed reliably and without malfunction.

According to the 68th claim of this invention, the control means reads the setting in the register of the electronic device and judges whether the input/output means of the electronic device has both a function for data input/output by serial transfer and a function for data input/output by parallel transfer, and, when the control means judges that the input/output means of the electronic device has both a function for data input/output by serial transfer and a function for data input/output by parallel transfer, in the initial state the function for data input/output by serial transfer is executed, when the function for data input/output by parallel transfer is to be executed, the control means changes the prescribed identification bit in the write area of the register, and when data input/output by serial transfer is to be performed, the control means returns the prescribed identification bit in the write area of the register to the original value. By this means, switching between serial transfer and parallel transfer can be performed reliably and without malfunction.

According to the 69th claim of this invention, a plurality of types of memory functions in an electronic device are stipulated, and when a prescribed code indicating a memory function type is written at a prescribed address in the register, processing corresponding to the memory function type is performed; by this means circuit switching and other operations can be performed reliably and without malfunction, and moreover operations on numerous memory types can be performed.

Hence in conventional device it is not easy to perform, in particular, identification of electronic devices and switching of internal circuits, so that such identification and switching have not been performed in conventional electronic devices, information processing devices, adapter devices and information exchange systems, by means of the present invention, these problems can easily be eliminated.

BRIEF DESCRIPTION OF THE DRAWINGS

FIG. 3 is a table used to explain one aspect of an electronic device to which this invention is applied;

FIG. 4 is a table used to explain one aspect of an electronic device to which this invention is applied;

FIG. 6 is a flowchart of a portion of this flowchart;

FIG. 7 is a flowchart used to explain the processing operation of one aspect of an electronic device to which this invention is applied;

FIG. 8 is a timing chart used to explain serial transfer in one aspect of an electronic device to which this invention is applied;

FIG. 11 is a table used to explain the processing operation of one aspect of an electronic device to which this invention is applied;

FIG. 12 is a control pattern diagram of the principal portion in processing operation of one aspect of an electronic device to which this invention is applied;

BEST MODE FOR CARRYING OUT THE INVENTION

In this invention, a function for data input/output by parallel transfer is additionally provided, and moreover a register is provided, having a prescribed write area and read area, to make settings when executing functions, and a prescribed code is provided at a prescribed address of the register, indicating that a function for data input/output by parallel transfer has been appended; by this means, an electronic device can be identified using simple means, and this can be employed to perform internal circuit switching and other operations extremely smoothly.

Figure 1:
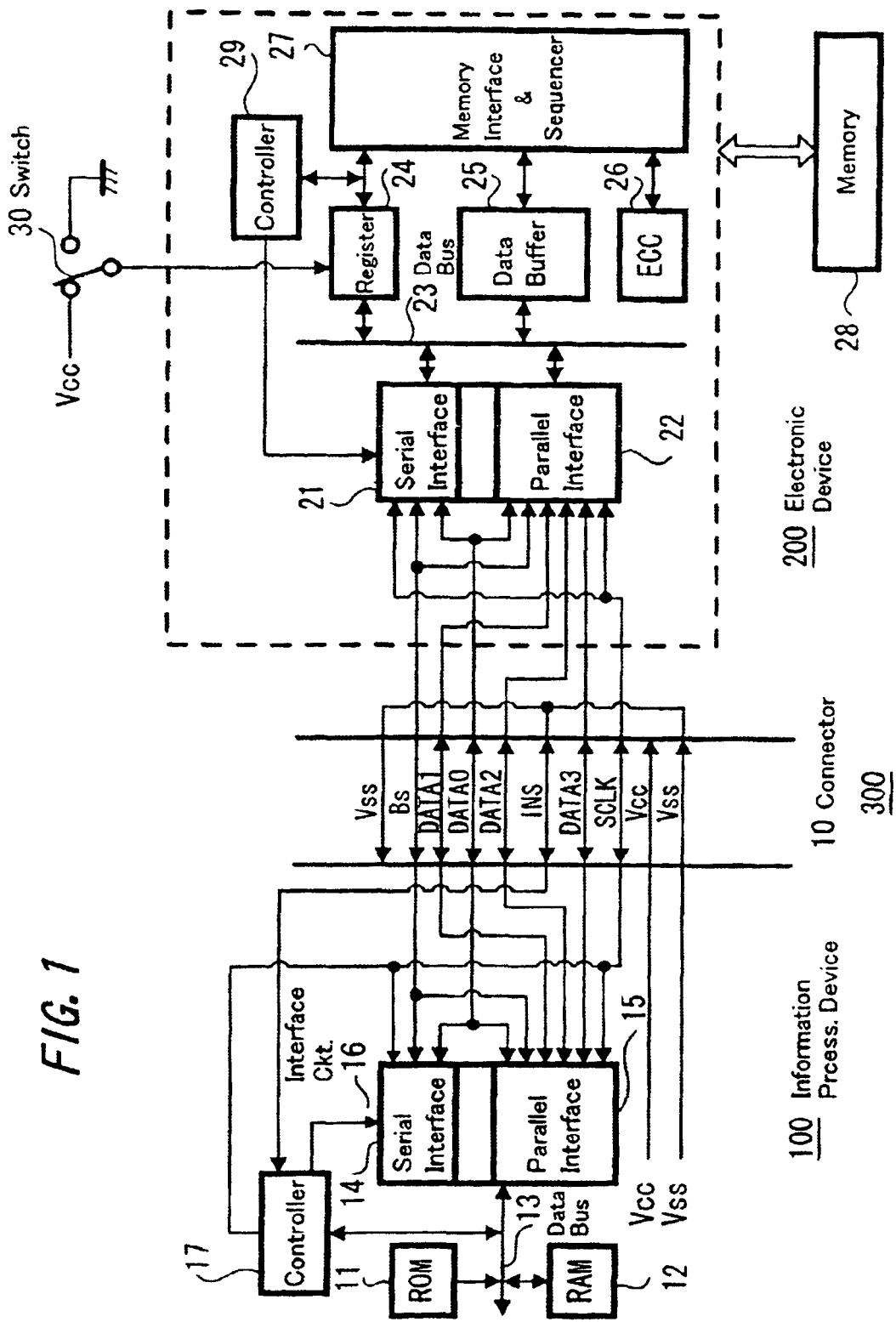
FIG. 1 is a block diagram showing the configuration of one aspect of an electronic device and information processing device to which this invention is applied.

FIG. 1 is a block diagram showing the configuration of one aspect of an electronic device and information processing device to which this invention is applied, for use in explaining this invention with reference to the drawings.

In FIG. 1, the left side of the drawing shows the configuration of the principal portions of a personal computer or similar, which serves as the information processing device 100. This information processing device 100 is provided with a data bus 13 connected to read-only memory (ROM) 11, random-access memory (RAM) 12, and similar; the data bus 13 is connected to an interface circuit 16, comprising a serial interface 14 and parallel interface 15.

A controller 17 is connected to the data bus 13; data input/output control and other operations are performed by this controller 17. The serial interface 14 and parallel interface 15 within the interface circuit 16 are switched by control signals from this controller 17. Signal lines from the serial interface 14 and parallel interface 15 are connected to the connector 300.

On the connector 300 are provided, for example, ten pins. Of these, six pins, for example, are used to perform signal input/output. Hence signal lines from the serial interface 14 and the parallel interface 15 are used in common and connected to the connector 300. That is, for example, the first pin from the top and the tenth pin (Vss) from the top in the drawing are connected to power supply lines. The second pin (BS) is connected to a protocol bus state signal line which is common to the serial interface 14 and parallel interface 15.

The third pin (DATA1) is connected to the first data line of the parallel interface 15. The fourth pin (DATA0) is connected in common to the serial data line of the serial interface 14 and to the 0th data line of the parallel interface 15. The fifth pin (DATA2) is connected to the second data line of the parallel interface 15. The seventh pin (DATA3) is connected to the third data line of the parallel interface 15.

The sixth pin (INS) is connected to the controller 17; connection of external equipment to the connector 300 is detected. The eighth pin (SCLK) is connected in common to the clock signal lines of the serial interface 14 and the parallel interface 15. The ninth pin (Vcc) is connected to the power supply line. In this way, various signal lines of the information processing device 100 are connected to, for example, the tenth pin of the connector 300.

Figure 2:
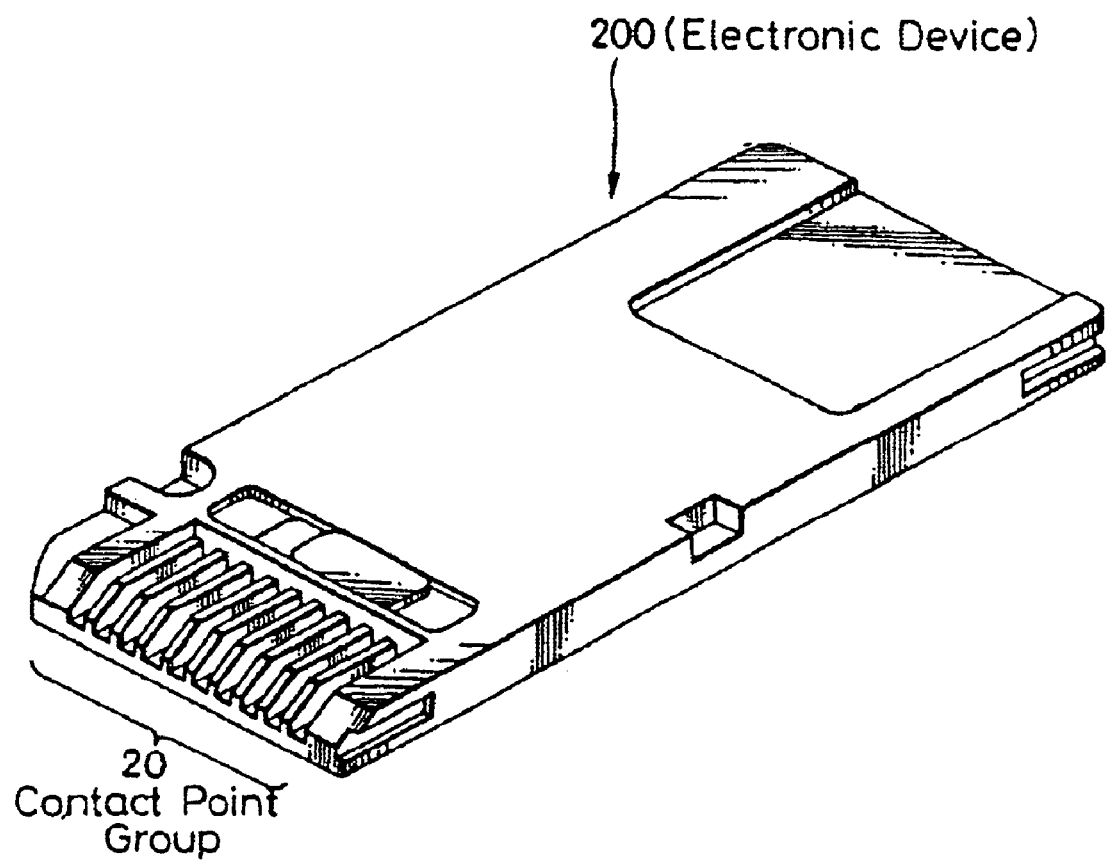
FIG. 2 is an external view of one aspect of an electronic device to which this invention is applied.

The right side of the drawing shows the configuration of the electronic device 200. The external view of this electronic device 200 may be, for example, that of a memory card device like that shown in FIG. 2, or may be a shape equivalent to a similar semiconductor memory device. This electronic device 200 is provided so as to enable attachment to and detachment from the information processing device 100 (not shown), and moreover is electrically connected to the above-described connector 300 via a group of, for example, ten contact points 20 formed at one end of the electronic device.

In FIG. 1, the serial interface 21 and parallel interface 22 provided in the electronic device 200 are connected to the connector 300 via the above-described contact point group 20 (not shown). Here also, signal lines are connected in common to the connector 300. That is, the first pin and the tenth pin (Vss) are connected together and connected to an internal power supply line (not shown). The second pin (BS) is connected in common to the protocol bus state signal lines of the serial interface 21 and parallel interface 22.

The third pin (DATA1) is connected to the first data line of the parallel interface 22. The fourth pin (DATA0) is connected in common to the serial data line of the serial interface 21 and to the 0th data line of the parallel interface 22. The fifth pin (DATA2) is connected to the second data line of the parallel interface 22. And the seventh pin (DATA3) is connected to the third data line of the parallel interface 22.

The sixth pin (INS) is connected to a connection midpoint between the first pin and the tenth pin (Vss). By this means, when external equipment is connected to the connector 300, the power supply (Vss) is connected to the controller 17 and detection is performed. Clock signal lines for the serial interface 21 and parallel interface 22 are connected to the eighth pin (SCLK). The ninth pin (Vss) is connected to an internal power supply line (not shown). In this way, the various signal lines of the electronic device 200 are connected to the, for example, ten pins of the connector 300.

Hence in this electronic device 200, the contents of each of the first through tenth pins are as shown in FIG. 3. FIG. 3 shows in summary, for each of the first through tenth pins shown on the left side, the pin name, whether the pin is used for input or output (I/O), and applications of each pin during serial transfer and parallel transfer.

In the electronic device 200, the serial interface 21 and parallel interface 22 are connected to the data bus 23, and this data bus 23 is connected to the register 24 and data buffer 25. This data buffer is connected to a circuit 26 for error correction code (ECC) generation and correction processing. The register 24, data buffer 25, and ECC circuit 26 are connected to a memory interface and sequencer circuit 27, and data is exchanged with the memory 28.

The register 24 is connected to the controller 29, and this controller controls data input and output. Switching between the serial interface 21 and parallel interface 22 is performed through control signals from the controller 29. In other words, the serial interface 21 and parallel interface 22 are formed within a single integrated circuit, and switching is performed by means of, for example, control signals from the controller 29.

In these devices, switching between the serial interfaces 14, 21 and parallel interfaces 15, 22 is performed through discrimination, by the controllers 17 and 29, of a portion of the data written to the register 24.

The configuration of the register 24 is shown in FIG. 4. In FIG. 4, the register 24 comprises addresses from, for example, "00" to "FF" (where "--" denotes a hexadecimal value), and at each address is provided a read register and a write register of two bytes each. Internal information of the electronic device 200 is read from these read registers, and information is written from the information processing device 100 to the write registers.

In the register 24, the address "00" is unused. The read register at address "01" is an interrupt (INT) register, and the read register at address "02" is a status register. The write registers at addresses "01" and "02" as well as address "03" are unused. The address "04" is a type number register; address "05" is an identification register for logical access of memory functions.

Further, address "06" is a category number register. The read register of address "07" is a class number register. The write register of address "07" is unused. Address "08" is also unused. Addresses "09" through "0E" are undefined. The read register of address "0F" is undefined, and the write register is unused.

Address "10" is a system parameter register. The write registers of addresses "11" and "12" are page count 1, 0 registers. Addresses "13" through "16" are page address 3 to 0 registers. The write register of address "17" is a transfer protocol command (TPC) parameter register. The write register of address "18" is a command (CMD) parameter register. The read registers of addresses "11" to "18" are unused.

The format for addresses "19" through "1F" is being formulated. The address "F0" is an inhibit parameter register used by a factory or similar. Addresses "1F" through "FF", except for address "F0", are unused.

Employing this register 24, switching between the serial interfaces 14, 21 and the parallel interfaces 15, 22 is controlled.

Figure 5:
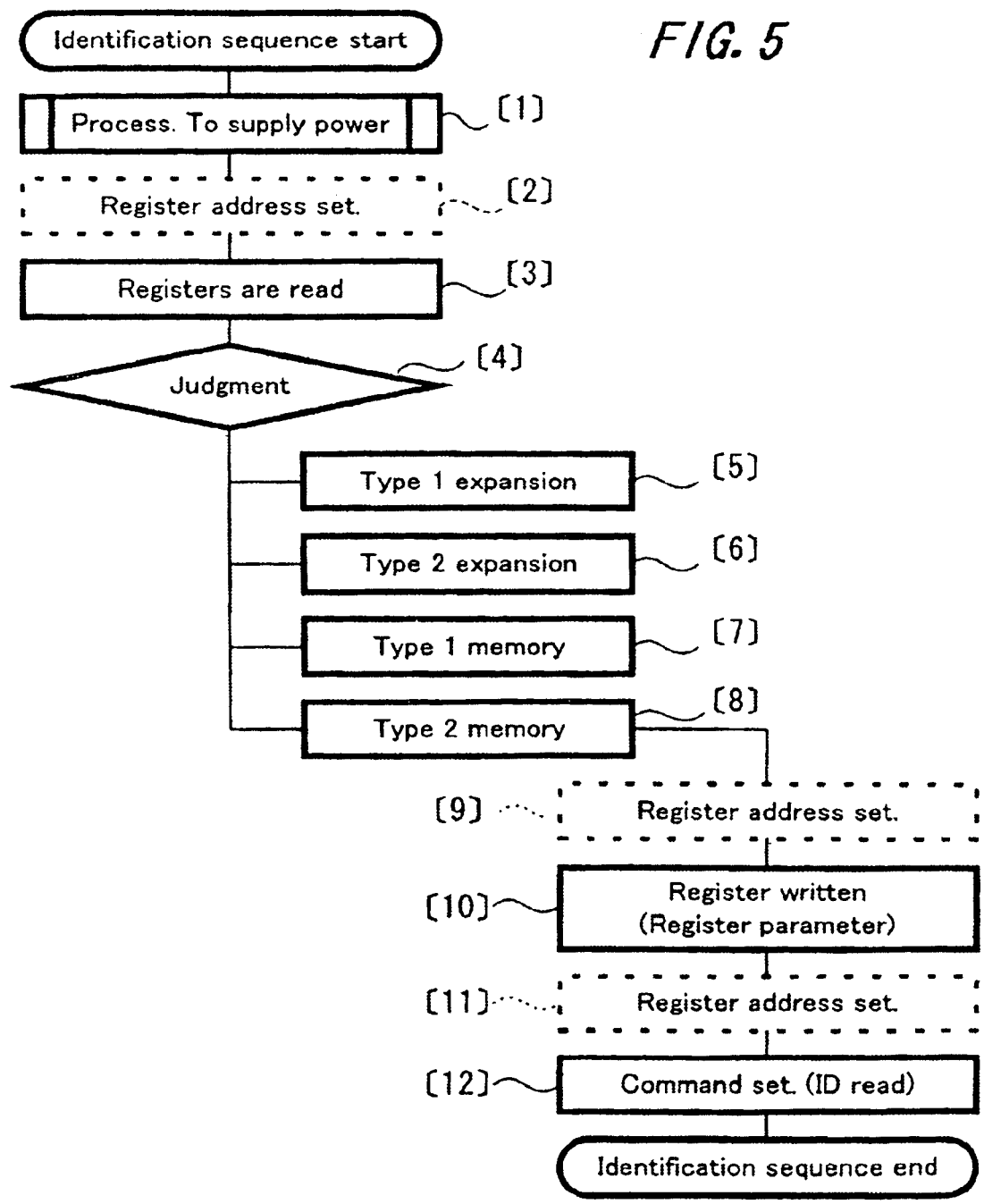
FIG. 5 is a flowchart used to explain the processing operation of one aspect of an electronic device to which this invention is applied.

When the electronic device 200 is mounted in the information processing device 100, startup processing is performed, following for example the flowchart of FIG. 5. That is, when in FIG. 5 processing is started, first processing to supply power to the electronic device 200 is performed in step [1].

This step [1] to supply power comprises, for example, the subroutines shown in FIG. 6. In these subroutines, first in step [101] the potential of the signal line connected to the sixth pin (INS) of the connector 300 is set to the power supply level (Vss=Low). In step [102], the potential of this sixth pin (INS) is judged.

If in step [102] the potential of the sixth pin (INS) is found to be at power supply level (Vss=Low), in step [103] power supply to the electronic device 200 is begun. In step [104], a time of for example 10 msec elapses, and the processing of step [1] to supply power to the electronic device 200 ends.

Next, in step [2] of FIG. 5, the information processing device 100 sets addresses for writing and reading in the register 24 for the electronic device 200. That is, in the initial states of these devices, data transfer is performed by serial transfer, and is executed with, for example, the timing shown in FIG. 7.

During transfer from the information processing device 100 to the electronic device 200, when the potential of the protocol bus state signal line of the second pin (BS) of the connector 300, shown in FIG. 7A, is at high potential, the transfer protocol command (TPC) is output to the fourth pin (DATA0) as shown in FIG. 7B. Here the TPC to set the address for reading and writing of the register 24 is output. FIG. 7C shows the output of a clock signal to the clock signal line (SCLK).

When the potential of the protocol bus state signal line of the second pin (BS) of the connector 300, shown in FIG. 7A, is at low potential, data is output to the fourth pin (DATA0) as shown in FIG. 7B, and here the set address value is output. In this case, for example in processing to identify the electronic device 200, the category register at address "06", type register at address "04", memory function logical access identification register at address "05", and status 0 register at address "02" are set in sequence.

In other words, at the above-described addresses, first the category number of address "06" indicates the functions comprised by the electronic device 200, and a value of "00" or "FF" indicates that the electronic device 200 comprises memory functions. A value of other than "00" or "FF" indicates that memory functions are not comprised. In the following explanation, an electronic device 200 comprising memory functions is called a memory device, and an electronic device 200 not comprising memory functions is called an expansion device.

The type register of address "04" indicates functions added to the electronic device 200; a value of "01" indicates that a function for data input/output by parallel transfer has been additionally provided in the electronic device 200. A value of "00" or "FF" indicates that additional functions have not been provided. In the following explanation, an electronic device 200 comprising a parallel input/output function is called type 2, and an electronic device 200 not comprising a parallel input/output function is called type 1.

In a type 2 electronic device of this aspect, the internal controller has a function to convert a logical address in data sent from the information processing device 100 into a physical address in the internal flash memory of the electronic device, referencing a table consisting of a plurality of logical addresses in sector units and the corresponding physical addresses. Hence an information processing device 100 can use logical addresses for access when communicating with a type 2 electronic device.

However, the internal controller in a type 1 electronic device does not have a function to convert logical addresses into physical addresses. Hence when an information processing device 100 accesses a type 1 electronic device, communication must employ physical addresses. When communicating with a type 1 electronic device, an information processing device 100 references a table consisting of a plurality of logical addresses in cluster units, which are collections of pluralities of sectors, and corresponding physical addresses; by converting a logical address into a physical address, the amount of data in the table is reduced.

Due to differences in these communication methods also, the information processing device 100 must determine whether a mounted electronic device is a type 1 or a type 2 device.

The identification register of address "05" indicates the possibility of logical access of the memory functions of the electronic device 200; a value of "01" indicates that access employing logical addresses is possible, and a value of "00" or "FF" indicates that access employing logical addresses is not possible. When the lowermost bit of the status register of address "02" is "0", writing is permitted by memory functions, and when the lowermost bit is "1", writing is forbidden.

In step [3] of FIG. 5, the contents of each of the registers of register 24, set as described above, are read. In step [4], by judging the values read from each of the registers, the presence or absence of memory functions (memory device/expansion device), whether parallel input/output functions have been added (type 2/type 1), and similar can be judged, as indicated in steps [5] through [8].

In other words, in the above step [4], for example, the judgment shown in FIG. 8 is made. In FIG. 8, when, according to the contents of the addresses "06", "04", "05" and "02", the value at address "06" is other than "00" or "FF", the value at address "04" is "00" or "FF", and the value at address "05" is "00" or "FF", the device is a type 1 expansion device not comprising memory functions. In this case, the address "02" is ignored.

When however the value at address "06" is other than "00" or "FF", the value at address "04" is "01", and the value at address "05" is "00" or "FF", the device is a type 2 expansion device not comprising memory functions. In this case the address "02" is ignored.

When the value at address "06" is "00" or "FF", the value at address "04" is "00" or "FF", the value at address "05" is "00" or "FF", and the lowermost bit of the value at address "02" expressed in binary code (prefixed with a "b") is 1, the device is a type 1 memory device, and writing is forbidden, or is a type 1 expansion device having memory functions, but with writing forbidden.

When the value at address "06" is "00" or "FF", the value at address "04" is "00" or "FF", the value at address "05" is "00" or "FF", and the lowermost bit of the value at address "02" expressed in binary code (prefixed with a "b") is 0, the device is a type 1 memory device or a type 1 expansion device, and has memory functions.

When the value at address "06" is "00" or "FF", the value at address "04" is "01", the value at address "05" is "01", and the lowermost bit of the value at address "02" expressed in binary code (prefixed with a "b") is 1, the device is a type 2 memory device with writing forbidden, or is a type 2 expansion device having memory functions but with writing forbidden.

When the value at address "06" is "00" or "FF", the value at address "04" is "01", the value at address "05" is "01", and the lowermost bit of the value at address "02" expressed in binary code (prefixed with a "b") is 0, the device is a type 2 memory device or a type 2 expansion device, and has memory functions.

The following explanation is for the case (step [8]) of an electronic device 200 which for example has memory function, and has a parallel input/output function added (a type 2 memory device); however, the case of an electronic device 200 not having memory functions (a type 2 expansion device) (step [6]) is similar. That is, the following processing for parallel/serial switching of input/output functions is performed for such an electronic device 200. First, in step [9] the information processing device 100 sets the write/read addresses for register 24 in the electronic device 200.

At this time, data transfer is by serial transfer, and when the potential of the protocol bus state signal line shown in the above-mentioned FIG. 7A is at high potential, as indicated in FIG. 7B, a TPC to set a write/read address is output to the register 24. When the potential of the protocol bus state signal line shown in FIG. 7A is at low potential, data is output, as in FIG. 7B, and the system parameter register address "10" is output as the address value set.

In step [10], a system parameter is written to the write register at address "10" of the register 24. Here the uppermost bit of the system parameter is taken to be parallel/serial switching information for the input/output function; when this bit is "0", parallel transfer is performed, and when "1", serial transfer is performed. In the initial state, the bit is "1". When the value of this bit is changed, from the time the potential of the protocol bus state signal line next goes high, parallel/serial transfer switching of the input/output function is performed.

In this way, for example in the initial state the input/output function by serial transfer is switched to parallel transfer using the above-described procedure. When processing for parallel/serial transfer switching of the input/output function is performed, a system parameter the uppermost bit of which reflects this state is set in the read register at address "10" of the register 24, and read confirmation is employed by the information processing device 100.

After such parallel/serial transfer switching of the input/output function, processing to read the identification information (ID) of the electronic device 200 is performed. That is, in step [11] the information processing device 100 sets a write/read address for register 24 in the electronic device 200. And in step [12], the command for read processing of the identification information (ID) is set.

Figure 9:
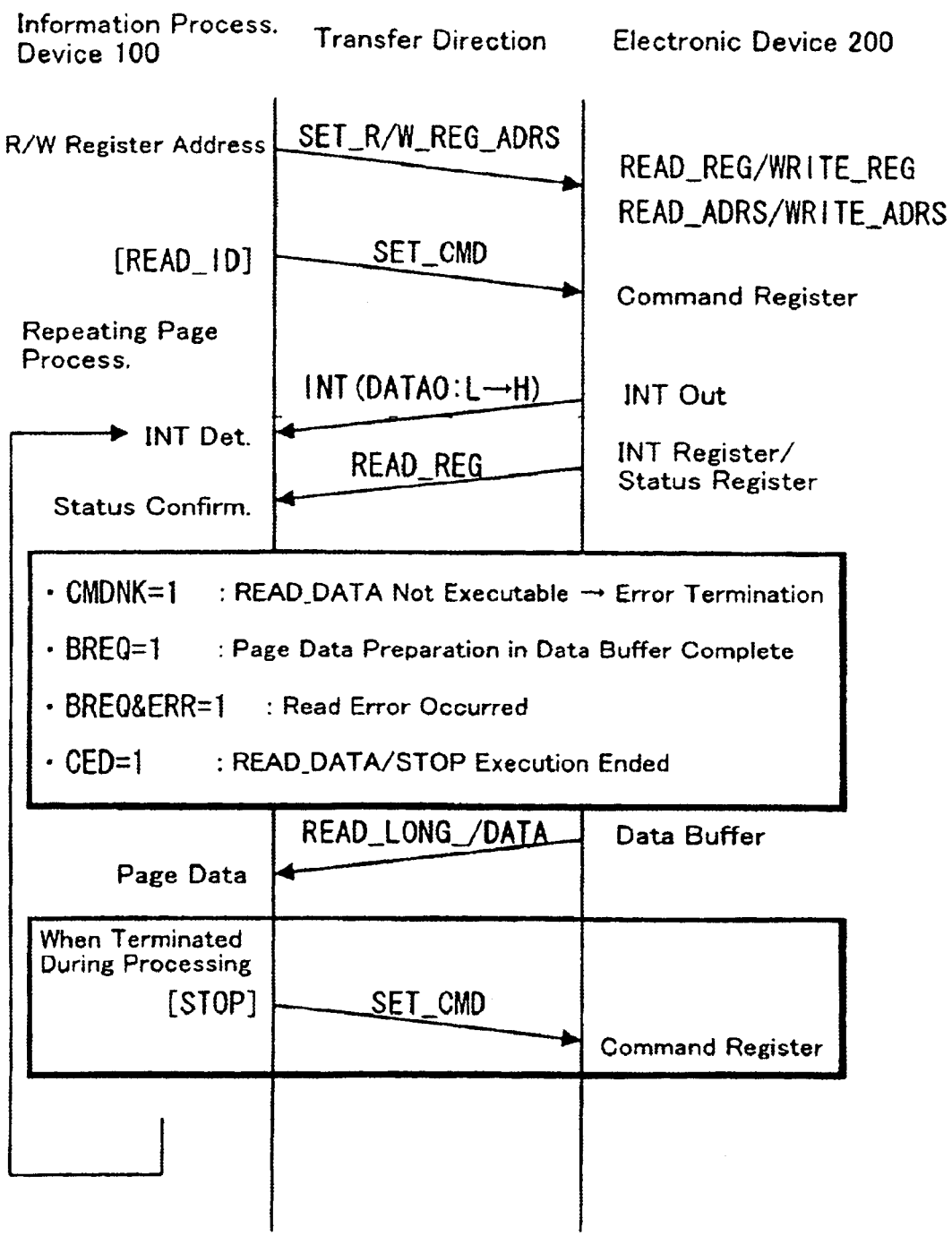
FIG. 9 is a table used to explain one aspect of an electronic device to which this invention is applied.

In this way, processing to read identification information (ID) for, for example, functions and manufacturing information is performed. In greater detail, processing to read identification information (ID) of the electronic device 200 by the information processing device 100 is performed using, for example, the control pattern shown in FIG. 9.

In other words, initially the information processing device 100 generates a write/read address (R/W RegAdrs), and this address is sent, together with the TPC to set the write/read address [SET R W REG ADRS], to the electronic device 200. By this means the write/read address (READ ADRS/WRITE ADRS) is set in the write/read register (READ REG/WRITE REG) in the electronic device 200.

Next, an identification information (ID) read command [READ ID] is generated by the information processing device 100, and this command is sent together with the TPC to set a command [SET CMD] to the electronic device 200. By this means, the read command [READ ID] is set in the command register of the electronic device 200. When the command is set in the electronic device 200 and the identification information (ID) can be read, data 0 of the interrupt (INT) register changes from low potential to high potential.

The change in data 0 of the interrupt (INT) register of the electronic device 200 is detected by an interrupt detect TPC [GET INT] from the information processing device 100. When this change is detected [INT(DATA0: L→H)], the interrupt (INT) register and status register of the electronic device 200 are read together with the TPC [READ REG]. By this means, the interrupt information and status of the electronic device 200 are confirmed by the information processing device 100.

In other words, among the contents of the interrupt (INT) register, the information processing device 100 obtains such interrupt information as:

CMDNK=1: READ DATA not executable→error termination

BREQ=1: page data preparation in data buffer complete

BREQ&ERR=1: read error occurred

CED=1: READ DATA/STOP execution ended

In response to this interrupt information, for example, a data read TPC [READ LONG DATA] is sent, and identification information (ID) is read from the data buffer of the electronic device 200 as page data. In the case of termination during processing, a stop command [STOP] is sent together with a command set TPC [SET CMD] from the information processing device 100 to the electronic device 200. This processing is repeated to read the page data in sequence.

This writing and reading is performed by parallel transfer when the electronic device 200 is type 2 and a parallel input/output function is provided, but when the electronic device 200 is type 1 and a parallel input/output function is not provided, the above-described parallel/serial transfer switching is not performed, and so reading and writing are performed by serial transfer.

Figure 10:
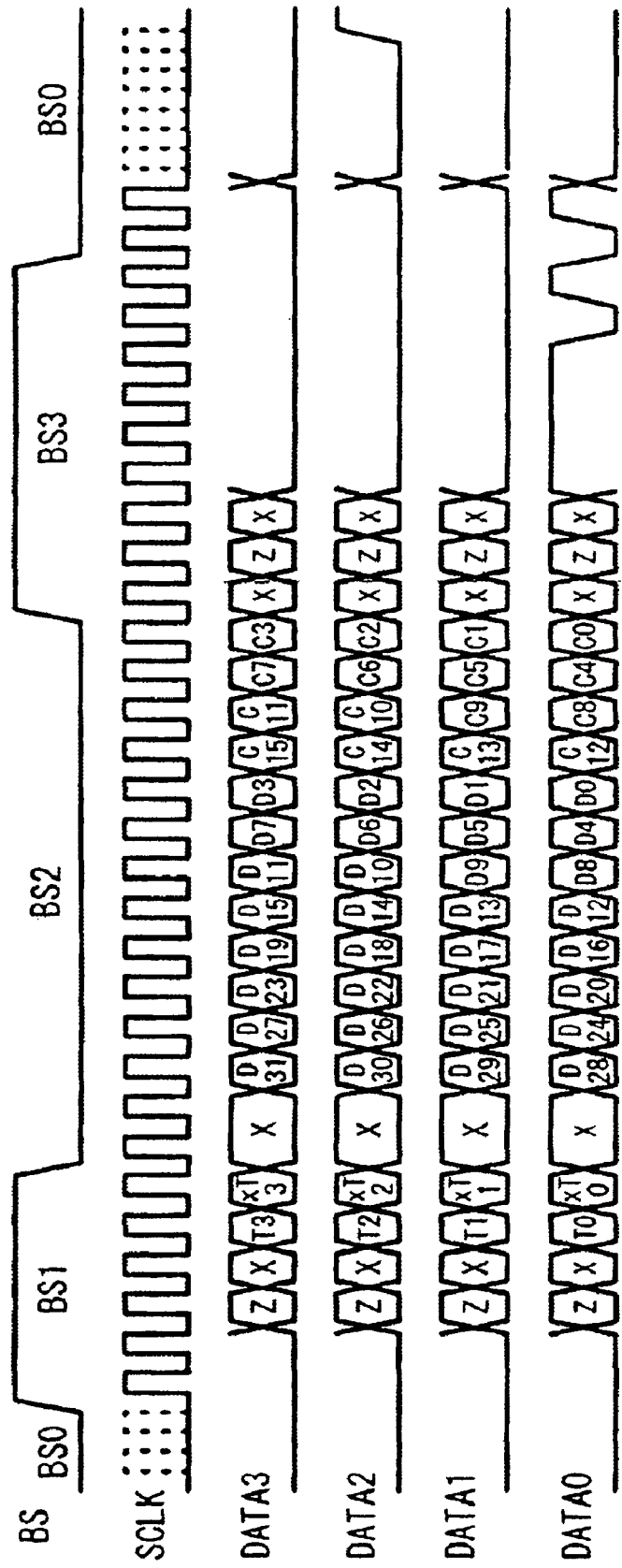
FIG. 10 is a diagram used to explain address conversion processing in one aspect of an electronic device to which this invention is applied.

In this case, writing and reading of data to and from the electronic device 200 by parallel transfer is performed, for example, as described below. FIG. 10 shows a timing chart for a case in which data is written to the electronic device 200 from the information processing device 100; FIG. 11 shows a timing chart for a case in which data from the electronic device 200 is read by the information processing device 100.

When data is written by the information processing device 100 of FIG. 10 to the electronic device 200, first, during the first high-potential interval (BS1) of the protocol bus state signal line (BS), a write TPC is transferred from the information processing device 100 to the electronic device 200. When the potential changes from the preceding low potential to high potential (BS0→BS1), the data transfer direction is switched, and so a data indeterminate interval of length 2SCLK is provided before the TPC. In order to coordinate timing with the read data packet, a data indeterminate period of length 2SCLK is also provided after the TPC.

During the next interval of low potential (BS2) of the protocol bus state signal line (BS), data (Dn) and error correction codes (CRC: Cm) are transferred from the information processing device 100 to the electronic device 200. Here the data and error correction code (CRC) are, for example, 4-bit parallel signals, and are output in a data array to the four pin (DATA0), third pin (DATA1), fifth pin (DATA2), and seventh pin (DATA3), as shown in the figure.

During the next high-potential interval (BS3), during the interval in which the signal BSY (a continuous signal at high or at low potential) is being output to the fourth pin (DATA0) to indicate processing in progress, the electronic device 200 judges whether the data packet ended normally, and reflects the result in the related register. After this, a signal RDY (a signal which is alternated at each SCLK period) is output to the fourth pin (DATA0) to indicate the completion of preparations.

During the next low-potential interval (BS0) of the protocol bus state signal line (BS), when an interrupt factor occurs as a result of internal operation of the electronic device 200, the interrupt (INT: high) signal corresponding to the interrupt factor is output to the data lines of the fourth pin (DATA0), third pin (DATA1), fifth pin (DATA2), and seventh pin (DATA3). However, in the low-potential interval (BS0), each of the above data lines is used as an interrupt (INT) signal line not synchronized with SCLK.

When data of the electronic device 200 is read by the information processing device 100 in FIG. 11, first a read TPC is transferred from the information processing device 100 to the electronic device 200 during the first high-potential interval (BS1) of the protocol bus state signal line (BS). Here, when the potential changes from the previous low potential to high potential (BS0→BS1), and when changing from high potential to the next low potential (BS1→BS2), the data transfer direction is switched, and so a data indeterminate period of length 2SCLK is provided before and after the TPC.

During the next low potential interval (BS2) of the protocol bus state signal line (BS), the electronic device 200 continuously outputs a BSY signal (a high potential or low potential signal) to the fourth pin (DATA0), indicating that processing is in progress, until transfer of the read data becomes possible. When transfer becomes possible, a RDY signal (a signal which is inverted each SCLK cycle) indicating preparations are completed is output to the fourth pin (DATA0) During the next high-potential interval (BS3), the data (Dn) and error correction codes (CRC: Cm) of the data lines of the fourth pin (DATA0), third pin (DATA1), fifth pin (DATA2), and seventh pin (DATA3) are read from the electronic device 200. Here the data and error correction codes (CRC) are output in a data array as, for example, 4-bit parallel signals to the data lines.

During the next low-potential interval (BS0) of the protocol bus state signal line (BS), when as a result of internal operation of the electronic device 200 an interrupt factor is generated, an interrupt (INT: high) signal corresponding to the interrupt factor is output to the data lines of the fourth pin (DATA0), third pin (DATA1), fifth pin (DATA2), and seventh pin (DATA3). However, in this low-potential interval (BS0), the above-described data lines are used as interrupt (INT) signal lines and are not synchronized with SCLK.

In this way, data writing and reading between the information processing device 100 and the electronic device 200 are performed. In this case, for example in step [9] of the above FIG. 5, the write/read address in the register 24 is set to "10", and a system parameter is written to the write register at this address "10"; by employing the uppermost bit of this system parameter as parallel/serial switching information for the input/output function, switching between parallel transfer and serial transfer can be performed easily.

In step [3] of FIG. 5, for example, the category number of address "06" of the register 24 and the contents of the type register of address "04" are read, and in step [4] the values read from each of the registers are examined, to judge whether there are memory functions (memory device/expansion device) and whether a parallel input/output function has been added (type 2/type 1); by this means, appropriate function switching and other operations on the mounted electronic device 200 can be performed.

Hence this aspect has input/output means having a function for data input/output by serial transfer and a function for data input/output by parallel transfer, as well as a register comprising a prescribed write area and read area and which stores settings indicating its own functions; consequently by storing, at a prescribed address of the register, a prescribed value indicating that the input/output means has a function for data input/output by serial transfer and a function for data input/output by parallel transfer, the electronic device can be identified using simple means, and this can be employed to perform internal circuit switching and other operations extremely smoothly.

Whereas in conventional devices, it is not easy to identify an electronic device or to perform internal circuit switching or other operations, and conventional information processing devices and electronic devices generally do not perform such identification and switching, by means of this invention these problems can easily be eliminated.

In the above-described aspect, switching between parallel transfer and serial transfer is performed at any time, and not only during processing to identify the above-described electronic device 200. That is, when comparing current consumption for parallel transfer and serial transfer, nearly twice the consumption current flows during parallel transfer compared with serial transfer. Hence by switching to serial transfer when high speed is not required in data transfer, and using parallel transfer only when high-speed data transfer is necessary, current consumption can be reduced.

In the above aspect, in the interrupt (INT) register provided in the read register at address "01" of the register 24, the uppermost bit D7 indicates the end of a command (CMD), and the next bit D6 is a flag indicating occurrence of an error or progress of the internal erase state (ERR/PRG). The next bit D5 indicates a request (BREQ) to access the data buffer of the information processing device 100, and the lowermost bit D0 indicates that command execution is not possible (CMDNK).

In the status register provided in the read register at address "02" of the register 24, the uppermost bit D7 indicates that power supply cutoff is permitted (MB); the next bit D6 indicates an error in the MG-R function; the next-lowermost bit D1 indicates the sleep state (SL) of the electronic device 200; and the lowermost bit D0 indicates write protection (WP). This write protection (WP) reflects the switched state of the write protection switch 30.

In the identification register for logical access of memory functions provided at address "05" of the register 24, identification of an address input to the electronic device 200 from the information processing device 100 as logical or as physical is performed. That is, whereas conventionally an address conversion function to convert between logical addresses for data processing and physical addresses for memory functions is provided in the information processing device 100, and an address value converted in advance into a physical address is input to the electronic device 200, in the above-described aspect, an address conversion function is provided within, for example, the controller 29.

By using the identification register for logical access of memory functions provided in the above address "05", when the values of both the write and read registers at this address "05" are "01", address conversion is not performed by the information processing device 100 since an address conversion function is incorporated within the electronic device 200, so that the speed of processing can be increased. Hence when the value of the address "05" is "01", the address conversion function of the electronic device 200 is used, and for values other than "01" the address conversion function of the information processing device 100 is used.

By this means, for example, the values of the page count 1, 0 of the write registers at addresses "11" and "12", and the page addresses 3 to 0 of the write registers at addresses "13" through "16", are taken to be logical addresses when the value at address "05" is "01", and are taken to be physical addresses when the value at address "05" is other than "01".

The category number provided at address "06" and the class number provided in the read register at address "07" in the register 24 are determined for example as shown in FIG. 12. In other words, in FIG. 12, the category number "00" indicates memory device functions; in this case, the class number is only the value "00". In an existing memory device, the addresses "06" and "07" are unused, and so the value "00" is provided in these addresses.

However, as a newly provided category number, the number "01" indicates an information device function, and the category number "02" indicates the functions of a LAN (Ethernet) or other connection device; category number "03" indicates the functions of a communication device; and category number "04" indicates the functions of a communication device as stipulated jointly by Japanese, American, and European manufacturers (Bluetooth). Also, "01" and later class numbers are assigned to these functions.

In addition to the above-described functions, the electronic device 200 can also be provided with, for example, camera functions, display functions, GPS (satellite-based Global Positioning System) functions, serial communication functions, or other functions, and can be mounted in the information processing device 100 for use. And in the case of a type 2 electronic device 200, each of these functions can employ parallel transfer for data input/output as necessary.

In the system parameter register provided at address "10" of the register 24, as explained above, the uppermost bit D7 of the system parameter is used as parallel/serial switching information for the input/output function; when this bit is "0", parallel transfer is used, and when "1", serial transfer is used. In the initial state, this bit is set to "1". When the value of this bit is changed, parallel/serial transfer switching of the input/output function is performed from the next time the potential of the protocol bus state signal line goes to high potential.

In the command (CMD) parameter register provided in the write register at address "18" of the register 24, for example, the lowermost bit D0 indicates the cleanup mode (CUMD); when this bit is "0", for example when a time interval or unnecessary data for memory functions exceeds a prescribed value, processing is performed automatically to erase the data. When this bit is "1", processing is performed manually. While these erase operations are being performed, the bit D6 of the above address "01" is set to "1".

In the inhibit parameter register provided at the address "F0" of the register 24, for example, the uppermost bit D7 indicates a mode to render TPCs invalid (FTPC) in inspections at the factory or similar, and is normally "0", but is set to "1" in order to invalidate TPCs. The next bit D6 is used during setup (FSUP) at the factory at the time of shipment. The lowermost bit D0 is used for testing input/output functions of memory functions in particular.

In this invention, the above-described register 24 can also be used to discriminate among various types of memory functions.

Figure 13:
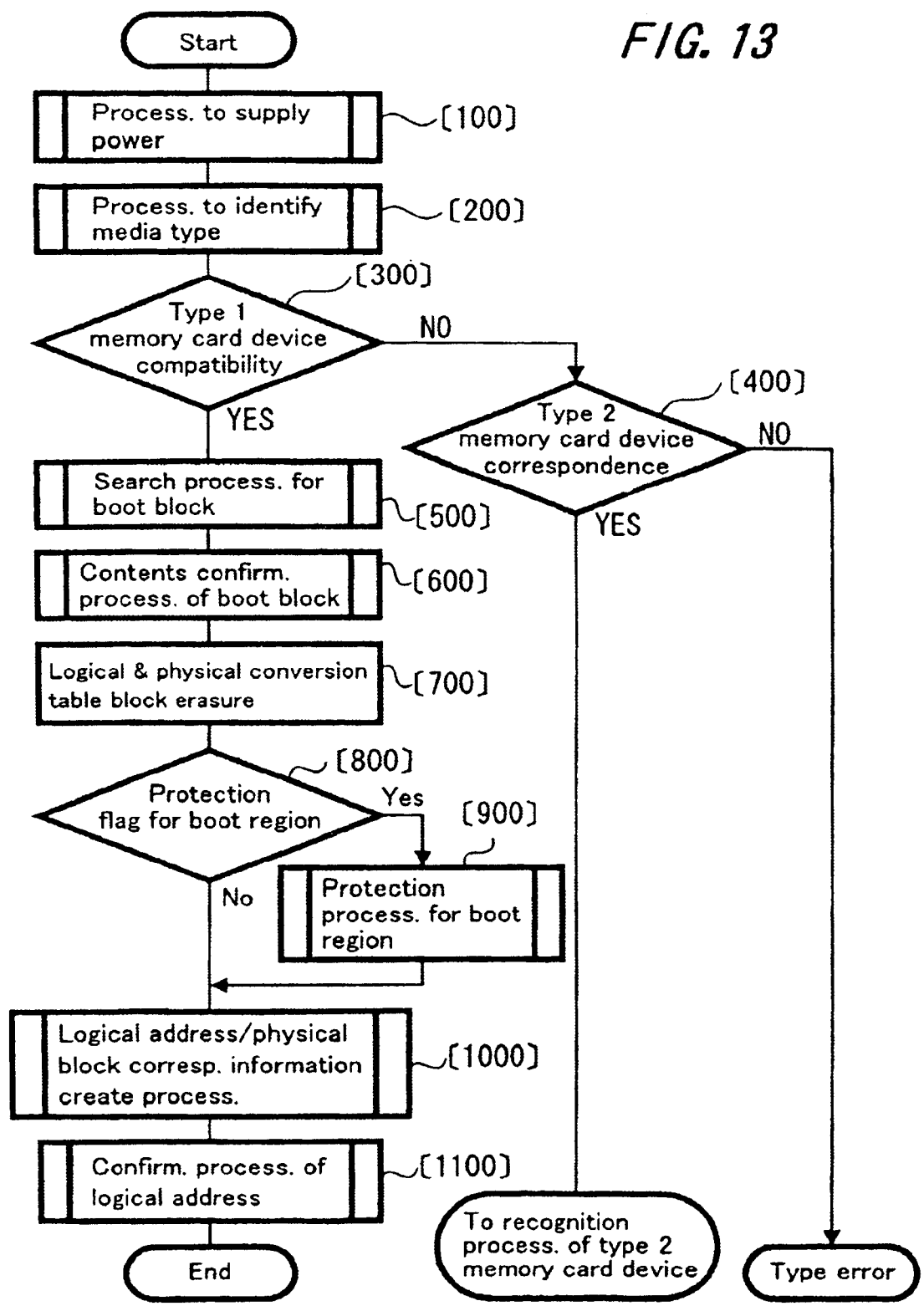
FIG. 13 is a timing chart used to explain parallel transfer in one aspect of an electronic device to which this invention is applied.

In other words, when making such a discrimination while the electronic device 200 is mounted in the information processing device 100, startup processing is performed according to, for example, the flowchart shown in FIG. 13. That is, when the processing in FIG. 13 is started, first in step [100] processing to supply power to the electronic device 200 is performed. This power supply input step [100] may be, for example, similar to the subroutine shown in the above-described FIG. 6.

Next, in step [200] processing to identify the type of the electronic device 200 is performed. The type identification processing of step [200] comprises, for example, a subroutine like that shown in FIG. 14. In this subroutine, first in step [201] a write/read address is set in the register 24.

That is, a write/read address for the register 24 is set in the electronic device 200 by the information processing device 100. In the initial states of these devices, data transfer is performed by serial transfer, and is executed with, for example, the timing shown in the above FIG. 7.

In this case, for example in processing to identify the type of the electronic device 200, the type address in the register 24 is set to "04", the category address to "06", the class address to "07", and the status 0 address to "02", in sequence. By this means, in step [202] the contents of the various addresses of the register 24 are read in sequence.

In step [203], the type value read at address "04" of the register 24 is judged, and in step [204] the category value of address "06" of the register is judged. If both these values are either "00" or "FF" (Yes), the electronic device 200 comprises memory functions.

In these steps [203] and [204], if both the type and category values are judged to be "00" or "FF" (Yes), in step [205] the class value read at address "07" of the register 24 is judged. If this value is "00" or "FF" (Yes), the electronic device is a type 1 memory device, and in step [206] the lowermost bit of status 0 at address "02" of register 24 is judged; if the lowermost bit value is "1" (Yes), the device is in the write-protected state, and if the value is "0" (No), it is identified as a device to which writing is possible.

In step [205], when the class value is other than "00" or "FF" (No), in steps [207], [208] and [209] the specific class value read at address "07" of the register 24 is judged. If in step [207] the value is judged to be "01", the electronic device is identified as a type 1 read-only memory (ROM) card device; if in step [208] the value is judged to be "03", the electronic device is judged to be a read-only memory (ROM) card device differing in format from type 1, and if in step [209] the value is judged to be "02", the electronic device is identified as a write-once (append-only) memory (R) card device.

In step [204], if the category value is other than "00" or "FF" (No), and if in steps [207] to [209] none of the values was judged to be as described above (No), the electronic device 200 does not comprise memory functions, or, the type value read in step [202] at address "04" of the register 24 is erroneous (type error).

On the other hand, when in step [203] the type value judged at address "04" of the register 24 is other than "00" or "FF" (No), in step [210] the type value at address "04" is examined to determine whether it is "01". If the type value is "01" (Yes), in step [211] the category value read at address "06" of the register 24 is judged. If the category value is "00" (Yes), the electronic device 200 comprises memory functions supporting high-speed operation.

In step [212], the class value at address "07" of the register 24 is judged. If the class value is "80" (Yes), the electronic device is a memory card device supporting high-speed operation, and in step [213] the lowermost bit of status 0 at address "02" of the register 24 is judged; if the lowermost bit is "1" (Yes), the device is in the write-protected state, and if the value is "0" (No), it is identified as a device to which writing is enabled.

In step [212], when the class value is not "80" (No), in steps [214], [215] and [216] the specific class value read at address "07" of the register 24 is examined. In step [214], if the value is judged to be "81", the electronic device is identified as a read-only memory (ROM) card device; if in step [215] the value is judged to be "83", the device is identified as a read-only memory (ROM) device supporting high-speed operation in a different format; and if in step [216] the value is judged to be "82", the device is judged to be a write-once memory (R) card supporting high-speed operation.

In step [210], if the type value is not "01" (No), and if in steps [214] to [216] any of the values is judged to be other than those described above (No), either the electronic device 200 does not comprise memory functions, or the type value read in step [202] at address "04" of the register 24 is erroneous (type error).

Figure 14:
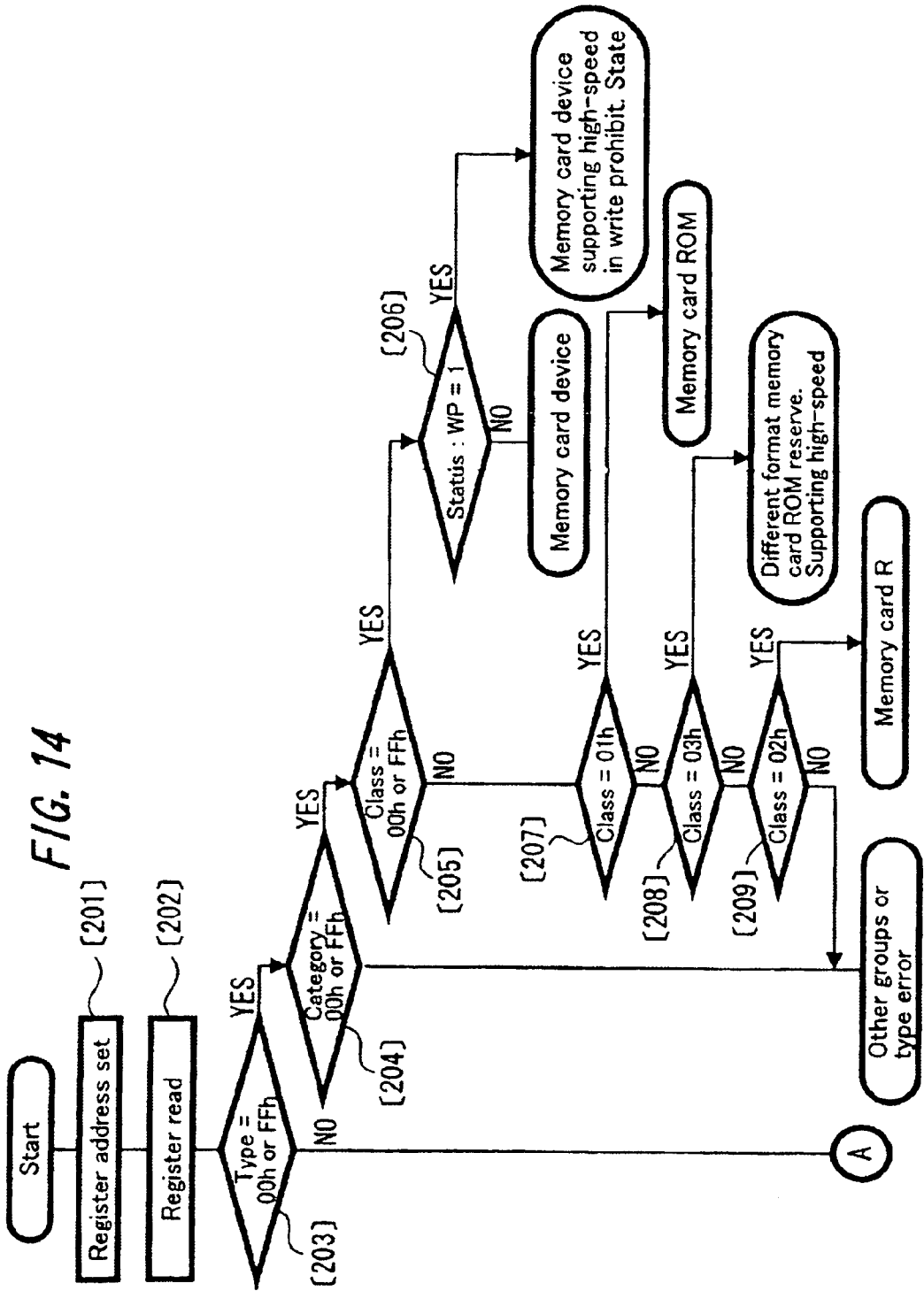
FIG. 14 is a timing chart used to explain parallel transfer in one aspect of an electronic device to which this invention is applied.
Figure 15:
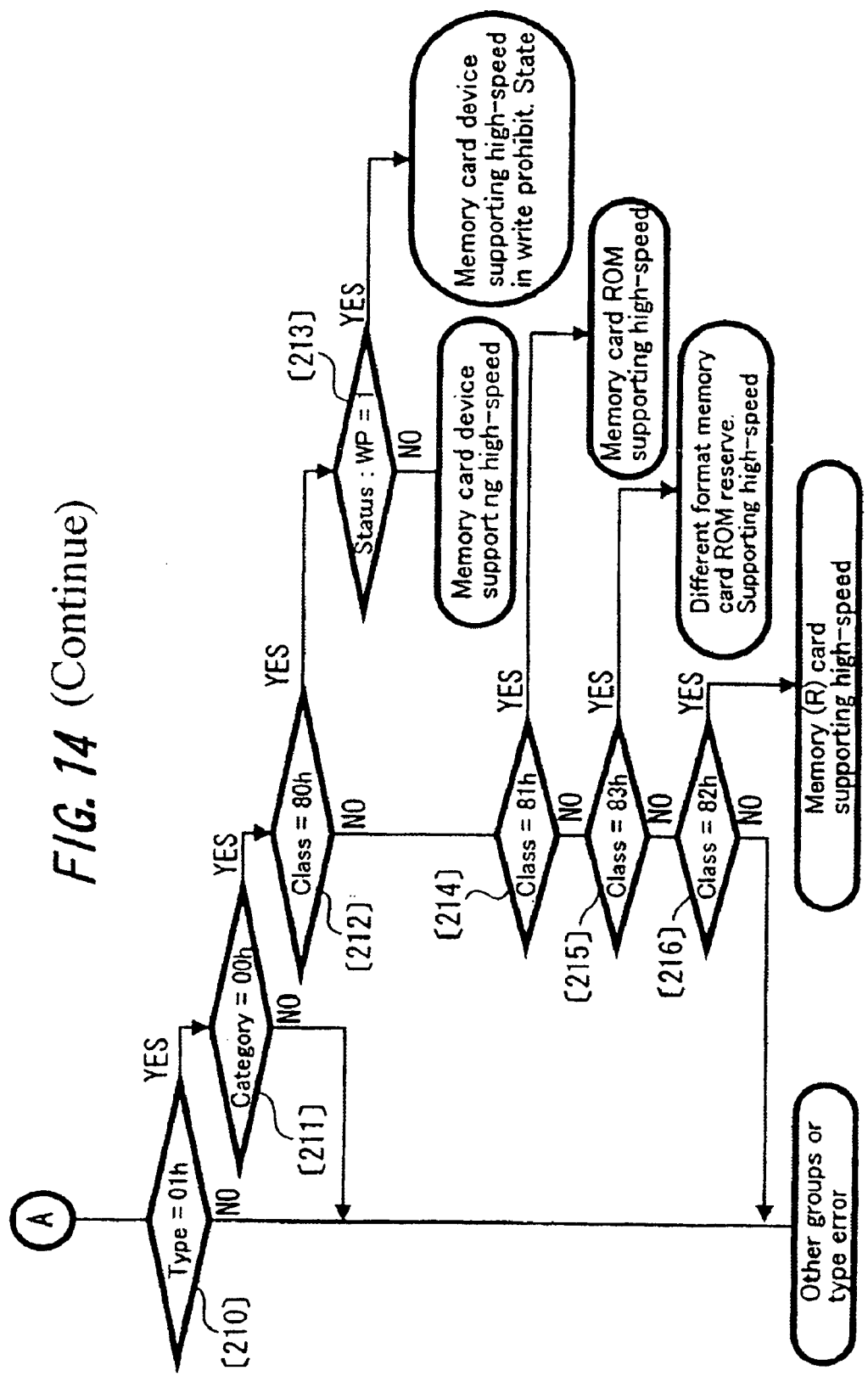
FIG. 15 is a table used in this explanation.

The types of memory card device (electronic device 200) identified by the subroutine shown in the above-described FIG. 14 are summarized by the table in FIG. 15. In this table, the column labeled "Type" at the left-hand edge is the value at the address "04" of the above-described register 24; the category column next to this shows the value at the address "06"; and the class column next to this indicates the value at the address "07". In the above-described subroutine of FIG. 14, the types indicated on the right-hand side are identified according to the values at each of these addresses.

Hence in this table, when the type at address "04" and the category value at address "06" are "00" or "FF", and the class value at address "07" is "00" or "FF", the electronic device is a type 1 memory card device without a logical-physical address conversion function (hereafter called a logical/physical conversion function), or is a read-only memory (ROM) card device.

When the class value is "01", the electronic device is a read-only memory (ROM) card device without a logical/ physical conversion function. When the class value is "02", the electronic device is a write-once memory (R) card device without a logical/physical conversion function. When the class value is "03", the electronic device is a type 1 read-only memory (ROM) card device without a logical/ physical conversion function (for example, memory other than flash memory). And, when the class value is from "04" to "FE", the identified value is erroneous (type error).

When the type value at address "04" is "00" or "FF" and the category value at address "06" is from "01" to "7F", the electronic device is an input/output device or other expansion module having a shape similar to a memory card device, without a logical/physical conversion function. And when the category value at address "06" is between "80" and "FE", the identified value is erroneous (type error).

When the type value at address "04" is "01", and the category value at address "06" is "00" or "FF", while the class value at address "07" is "00" or "FF", the electronic device is a type 2 memory card device with an internal logical/physical address conversion function (hereafter, a logical/physical conversion function), or is a read-only memory (ROM) card device.

When the class value is "01", the device is a read-only memory (ROM) card device with internal logical/physical conversion function. And when the class value is "02", the device is a write-once memory (R) card device with an internal logical/physical conversion function. When the class value is "03", the device is a different type 1 read-only memory (ROM) card device (for example, memory other than flash memory) with an internal logical/physical conversion function. On the other hand, when the class value is between "04" and "7F", the identified value is erroneous (type error).

When the class value is "80", the device is a type 2 memory card device without a logical/physical address conversion function (hereafter logical/physical conversion function), or is a read-only memory (ROM) card device.

And when the class value is "81", the device is a read-only memory (ROM) card device without a logical/physical conversion function. When the class value is "82", the device is a write-once memory (R) card device without a logical/physical conversion function. When the class value is "03", the device is a different type 1 read-only memory (ROM) card device (for example, memory other than flash memory) without a logical/physical conversion function. When the class value is between "84" and "FF", the identified value is erroneous (type error).

When the type value at address "04" is "01", and the category value at address "06" is from "01" to "7F" or is "FF", the device is a type 2 input/output (I/O) device or other expansion module having a shape similar to that of a memory card device, and with an internal logical/physical conversion function. When the category value at address "06" is from "80" to "83", the device is a type 2 input/output (I/O) device or other expansion module having a shape similar to that of a memory card device, without a logical/ physical conversion function. And when the category value at address "06" is between "80" and "FE", the identified value is erroneous (type error).

In this way, in step [200] of FIG. 13 processing is performed to identify the type of the electronic device 200. In step [300] of FIG. 13, a judgment as to whether, for example, an address conversion function is incorporated is performed, according to the above-described identified type of the electronic device 200. If no function is incorporated (No), in step [400] a judgment as to whether the device corresponds to a type 2 memory card device is performed; if the device does correspond to a type 2 memory card device (Yes), processing to recognize the type 2 memory card device begins, and otherwise (No) the identified value is erroneous (type error).

In step [300] of FIG. 13, when for example an address conversion function is judged to be incorporated (Yes), in step [500] processing to search for a boot block is performed, and in step [600] processing is performed to confirm the contents of the boot block. In step [700], a conversion table block of logical addresses and physical addresses, provided in advance, is erased, and in step [800] a judgment is performed as to whether there is a protection flag for the boot region; if there is, in step [900] protection processing for the boot region is performed. In step [1000], processing to create correspondence information for logical addresses and physical addresses is performed and a new conversion table is created, and in step [1100] processing to confirm logical addresses is performed.

That is, in for example an electronic device 200 comprising a parallel input/output function, the internal controller has a function to convert the logical addresses of data sent by the information processing device 100 into the physical addresses of flash memory within the electronic device. This conversion is performed by referring to a table comprising a plurality of logical addresses, for example in sector units, and corresponding physical addresses.

Figure 16:
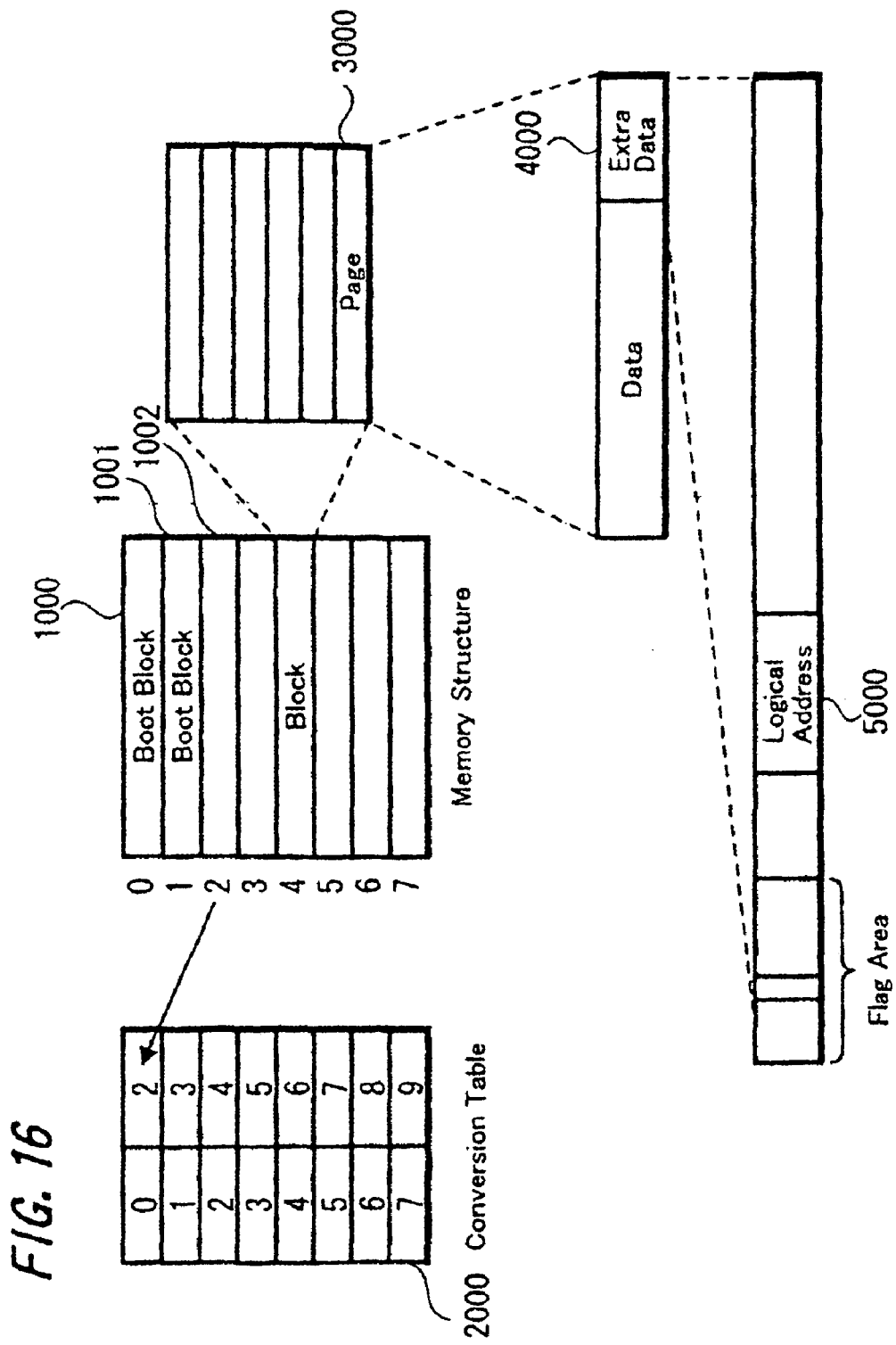
FIG. 16 is a memory structure used in this explanation.

In the creation of the new conversion table in the above step [1000], when a boot block is provided in for example the blocks 1000, 1001 in, for example, the memory structure shown in FIG. 16, and the conversion table 2000 is provided in the subsequent block 1002, this conversion table 2000 is taken to be the conversion table of the internal controller.

When a conversion table 2000 is not provided, a search is performed for an extra data area 4000 for each of the pages 3000 of each data block, logical addresses 5000 in each are read in sequence, logical addresses corresponding to physical addresses are detected, and by performing this detection for all physical addresses, a conversion table comprising logical addresses and the physical addresses corresponding thereto is formed.

In the above-described electronic device, information processing device, and information exchange system using these devices, by means of having input/output means having a function for data input/output by serial transfer and a function for data input/output by parallel transfer as well as a register comprising a prescribed write area and read area and in which settings indicating the functions of the device itself are stored, and by storing, in a prescribed address of the register, a prescribed value indicating that the input/output means has a function for data input/output by serial transfer and a function for data input/output by parallel transfer, the electronic device can be identified using simple means, and this can be employed to perform internal circuit switching and other operations extremely smoothly.

Among the above-described electronic devices, introduction of the following type of memory card device is being studied as, for example, a type 2 memory card device.

Among type 1 memory card device specifications, previously only media supporting writing and reading and having capacities up to 128 MB using, for example, flash memory had been stipulated; but a future strategy to broaden the scope of memory card devices in three different directions is being studied.

Support for faster operation and larger capacities
Support for content distribution
Support for devices other than memory Based on this concept, the above-described "type 2 memory card device", "read-only memory (ROM) card device", "write-once memory (R) card device", "high-speed memory card device", "input/output (I/O) device having the shape of a memory card device", and similar are defined.

A "type 2 memory card device" is an electronic device having large capacity and supporting a high-speed interface, and having, within the electronic device, a "logical-physical conversion" function characteristic of flash memory. Specifications stipulate capacities of up to 32 GB. There are four data lines in the high-speed interface, and by using a 40 MHz transfer clock, a data transfer speed of 1600 Mbps is supported; specifications also stipulate a "read-only memory (ROM) card device".

A "high-speed memory card device" is an electronic device supporting a high-speed interface, is compatible with type 1 memory card devices, and supports a high-speed interface. "Logical-physical conversions" are performed by the information processing device; capacities are the same as for type 1 memory card devices, and various security functions are also supported.

A "read-only memory (ROM) card device" is a read-only electronic device having compatibility with the read functions of a type 1 memory card device, and, in equipment compatible with existing memory card devices, can be used as a read-only electronic device. However, a type 1 memory card device which has been set for write-protection must output a message in association with write-protect switch operation or similar.

A "write-once memory (R) card device" is a write-once (append-only) memory card device, and must support a dedicated file system for writing. When equipment capable of writing to such devices performs, for example, "close processing", equipment compatible with type 1 memory card devices can be used to perform data reading from the device up to seven times as a read-only electronic device.

An "input/output (I/O) device or other expansion module having the shape of a memory card device" conforms to specifications in which a memory card device slot is expanded to enable control of function modules other than memory. In this case, the information processing device must have specialized control functions.

User interfacing after identification of the electronic device is performed as follows. The object is to provide easy-to-understand information on the compatibility of the electronic device, for each supported case.

When a "type 2 memory card device" is inserted into equipment supporting a type 1 memory card device, a boot block is not found, and so the device is recognized as a "defective memory card device", and an error occurs. The user must then distinguish between an "unsupported memory card device" and a "defective memory card device", and the message sent to the user must be changed. Specifically, even if the equipment does not support a "type 2 memory card device", the electronic device type should be correctly identified, and the fact that the device is an "unsupported memory card device" should be conveyed.

In the case of a "read-only memory (ROM) card device" also, a message for a type 1 device such as "please check the write protect switch" or "the memory card device is locked" should not be issued.

As a message to be issued for a new type of electronic device, for example, when an "unsupported memory card device" is inserted, when there are character limitations in the equipment and a common message must be conveyed, "memory card device type error" may be used. When there are no character limitations in the equipment, a message such as "the memory card cannot be used with this equipment", or "this is an unsupported memory card device", is used.

When an attempt is made to write to a "read-only memory (ROM) card device", if the equipment has a character limitation or similar and a common message is issued, "read-only memory" may be used. If there is no character limitation on the equipment, "this is a read-only memory card device" is used. However, these specific messages are no more than examples, and use of these messages without modification is not stipulated.

A type 1 memory card device (electronic device 200) may be used by direct insertion into a card slot of a personal computer (information processing device 100) supporting so-called PC cards, for example via an adapter device 400 as shown in FIG. 16. By providing an internal circuit such as that shown in FIG. 17 in such an adapter device 400, a type 1 memory card device (electronic device 200) can be operated at faster speeds.

Figure 17:
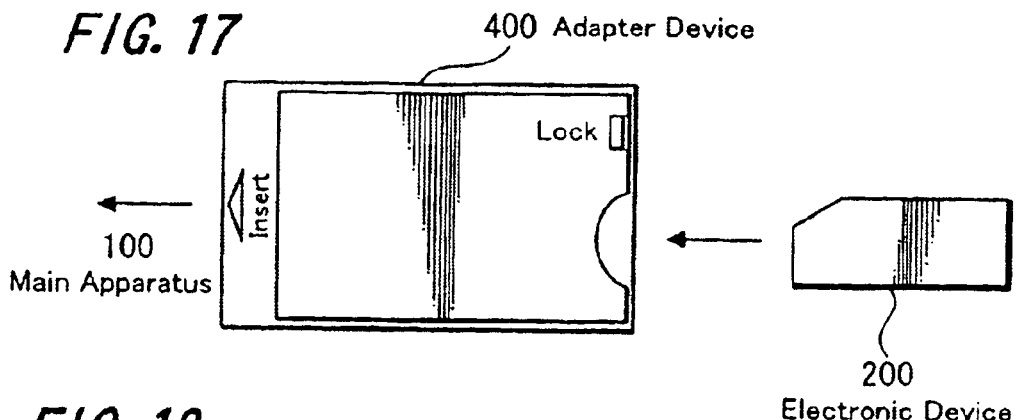
FIG. 17 is an external view of one aspect of an adapter device to which this invention is applied.

As the internal circuit of the adapter device 400, in FIG. 17, an interface circuit 401 with the electronic device 200 and an interface circuit 402 with the information processing device 100 are provided; in addition, a controller circuit 403, which controls the exchange of data between the interface circuits 401 and 402, is provided. The above-described register 24 is provided in this controller circuit 403, and in addition, a table 404 for conversion of addresses between logical addresses and corresponding physical addresses is also provided as an adjunct to the controller circuit 403.

Thus even for type 1 memory card devices, by performing address conversion from logical addresses to physical addresses within the adapter device 400, information exchange can be performed at high speed.

Figure 18:
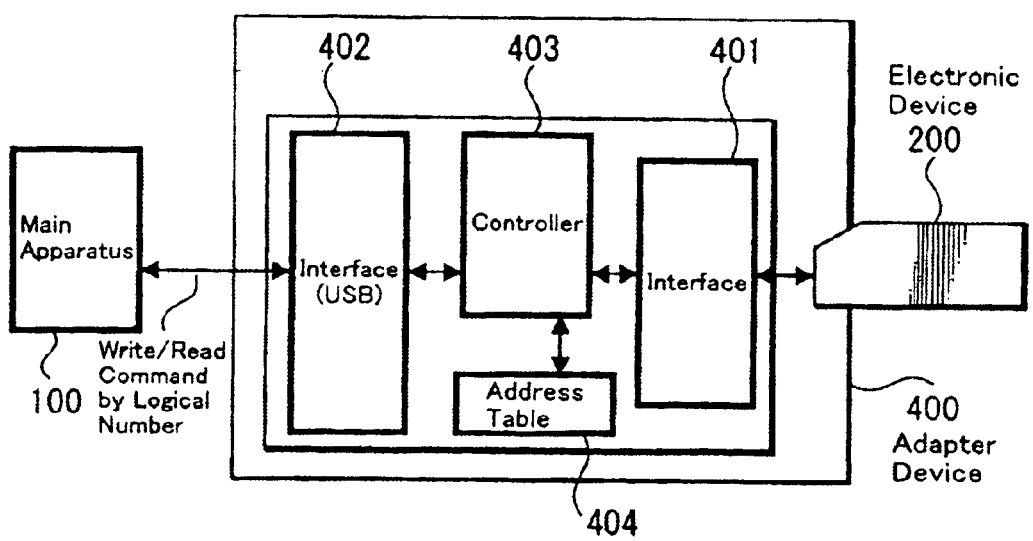
FIG. 18 is a block diagram showing the configuration of one aspect of an adapter device to which this invention is applied.
Figure 19:
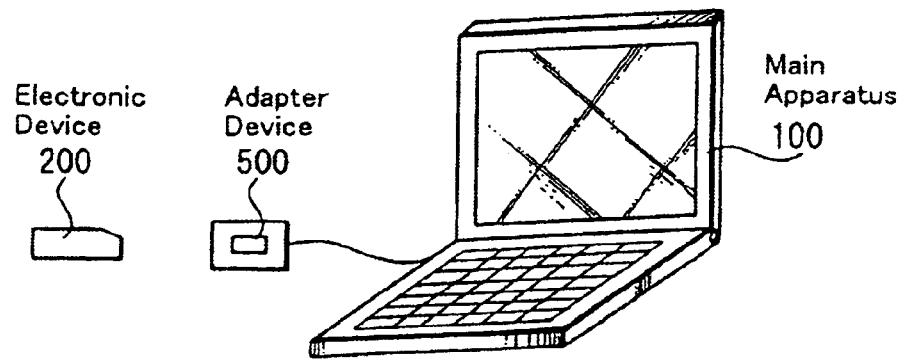
FIG. 19 is an external view of another aspect of an adapter device to which this invention is applied.

In the internal circuit shown in the above FIG. 17, the interface circuit 402 with the information processing device 100 can be made an interface circuit for a so-called Universal Serial Bus (USB), and so can be used as a device external to the information processing device 100, as for example in the case of the adapter device 500 shown in FIG. 18.

In the above-described adapter device, by means of having input/output means having a function for data input/output by serial transfer and a function for data input/output by parallel transfer as well as a register comprising a prescribed write area and read area and in which settings indicating the functions of the device itself are stored, and by storing, in a prescribed address of the register, a prescribed value indicating that the input/output means has a function for data input/output by serial transfer and a function for data input/output by parallel transfer, the electronic device can be identified using simple means, and this can be employed to perform internal circuit switching and other operations extremely smoothly.

The present invention is not limited to the aspects explained above, and various modifications are possible without deviating from the spirit of the invention.

That is, the electronic devices, information processing devices, adapter devices and information exchange systems explained in each of the above aspects do not limit the present invention, but are disclosed for the purpose of illustration. Hence the technical scope of this invention is as stipulated by the scope of claims, and various design modifications are possible within the technical scope stipulated therein.

What is claimed is:

1. An electronic device detachably connectable to an information processing device, comprising:
   a card-shaped housing including a plurality of terminals;
   an input/output means having a function for data input/output by serial transfer and a function for data input/output by parallel transfer; and
   register including a write area and a read area, the register storing a setting indicating the functions of the electronic device and storing a prescribed value at a prescribed address indicating that the input/output means has the function for data input/output by serial transfer and the function for data input/output by parallel transfer.

2. The electronic device according to claim 1, wherein the prescribed value stored in the register is transmitted to the information processing device via the input/output means in response to a register read instruction from the information processing device.

3. The electronic device according to claim 1, wherein the input/output means executes the function for data input/output by serial transfer or executes the function for data input/output by parallel transfer based on a setting from the information processing device.

4. The electronic device according to claim 1, wherein the function for data input/output by serial transfer is executed in an initial state of the electronic device, the function for data input/output by parallel transfer is executed when a prescribed identification bit in the write area of the register is changed from an initial value, and the function for data input/output by serial transfer is executed when the prescribed identification bit in the write area of the register is returned to the initial value.

5. The electronic device according to claim 1, wherein the functions of the electronic device include memory functions and an address conversion function which converts between logical addresses for data processing and physical addresses for the memory functions, and
   a prescribed code is recorded at a predetermined address of the register indicating that the electronic device includes the address conversion function.

6. The electronic device according to claim 1, wherein the functions of the electronic device include a plurality of types of memory functions, and
   a prescribed code is recorded at a predetermined address of the register indicating the types of the memory functions.

7. An electronic device detachably connectable to an information processing device, comprising:
   a card-shaped housing including a plurality of terminals;
   a register including a write area and a read area, the register storing a setting indicating the functions of the electronic device, the functions including a memory function managed using physical addresses, and an address conversion function which converts between logical addresses for data processing and physical addresses for the memory function, wherein
   a prescribed code is stored at a predetermined address of the register indicating that the electronic device includes the address conversion function.

8. The electronic device according to claim 7, further comprising:
   input/output means having a function for data input/output by serial transfer and a function for data input/output by parallel transfer, wherein a prescribed value is stored at a prescribed address of the register indicating that the input/output means has the function for data input/output by serial transfer and the function for data input/output by parallel transfer.

9. The electronic device according to claim 7, further comprising:
   input/output means having a function for data input/output by serial transfer and a function for data input/output by parallel transfer, wherein
   a prescribed value is stored in the register indicating that the input/output means has both the function for data input/output by serial transfer and the function for data input/output by parallel transfer, and
   the prescribed value stored in the register is transmitted to the information processing device via the input/output means in response to a register read instruction from the information processing device.

10. The electronic device according to claim 7, further comprising:
    input/output means having a function for data input/output by serial transfer and a function for data input/output by parallel transfer, wherein the input/output means executes the function for data input/output by serial transfer or executes the function for data input/output by parallel transfer based on a setting from the information processing device.

11. The electronic device according to claim 7, further comprising:
    input/output means having a function for data input/output by serial transfer and a function for data input/output by parallel transfer, wherein
    the function for data input/output by serial transfer is executed in an initial state of the electronic device,
    the function for data input/output by parallel transfer is executed when a prescribed identification bit in the write area of the register is changed from an initial value, and
    the function for data input/output by serial transfer is executed when the prescribed identification bit in the write area of the register is returned to the initial value.

12. The electronic device according to claim 7, wherein the functions of the electronic device include a plurality of types of memory functions, and
    a prescribed value is recorded at a predetermined address of the register indicating the types of the memory functions.

13. An information processing device which performs data input and output with a detachable electronic device, the information processing device comprising:

control means which reads a setting in a register of the electronic device indicating a function of the electronic device and which determines from a value in the register whether the input/output means of the electronic device has both a function for data input/output by serial transfer and a function for data input/output by parallel transfer.

14. The information processing device according to claim 13, wherein when the value in the register of the electronic device indicates that the input/output means of the electronic device has only a function for data input/output by serial transfer, the control means recognizes the electronic device as a first electronic device, and when the value in the register of the electronic device indicates that the input/output means of the electronic device has both a function for data input/output by serial transfer and a function for data input/output by parallel transfer, the control means recognizes the electronic device as a second electronic device.

15. The information processing device according to claim 13, further comprising:

transmission means, wherein when the control means determines from the value in the register that the input/output means of the electronic device has both a function for data input/output by serial transfer and a function for data input/output by parallel transfer, the transmission means transmits to the electronic device an instruction to execute the function for data input/output by serial transfer or to execute the function for data input/output by parallel transfer.

16. The information processing device according to claim 13, wherein when the control means determines from the value in the register that the input/output means of the electronic device has both a function for data input/output by serial transfer and a function for data input/output by parallel transfer:

the function for data input/output by serial transfer is executed in an initial state of the electronic device, when the function for data input/output by parallel transfer is to be executed, a prescribed identification bit in a write area of the register is changed from an initial value, and when the function for data input/output by serial transfer is to be executed, the prescribed identification bit in the write area of the register is returned to the initial value.

17. The information processing device according to claim 13, wherein the function of the electronic device includes an address conversion function which converts between logical addresses for data processing and physical addresses for memory functions in the electronic device, and when a prescribed code indicating that the electronic device includes the address conversion function is written at a prescribed address in the register, the address conversion function is rendered inactive.

18. The information processing device according to claim 13, wherein the electronic device includes a plurality of types of memory functions, and when a particular code indicating one of the memory function types is written at a prescribed address of the register, processing is performed according to the one of the memory function types.

19. An information processing device which performs data input and output with a detachable electronic device, the information processing device comprising:

control means which reads a setting in a register of the electronic device indicating a function of said the electronic device and which determines from a code in the register whether the electronic device includes an address conversion function which converts between logical addresses for data processing and physical addresses for memory functions in the electronic device.

20. The information processing device according to claim 19, wherein when the code in the register of the electronic device indicates that the electronic device includes the address conversion function, the control means recognizes the electronic device as a first electronic device, and when the code in the register of the electronic device indicates that the electronic device does not include the address conversion function, the control means recognizes the electronic device as a second electronic device.

21. The information processing device according to claim 19, wherein the control means reads a value in the register of the electronic device and determines based on the value whether input/output means of the electronic device has both a function for data input/output by serial transfer and a function for data input/output by parallel transfer, when the value in the register of the electronic device indicates that the input/output means of the electronic device has only a function for data input/output by serial transfer, the control means recognizes the electronic device as a first electronic device, and when the value in the register of the electronic device indicates that the input/output means of the electronic device has both a function for data input/output by serial transfer and a function for data input/output by parallel transfer, the control means recognizes the electronic device as a second electronic device.

22. The information processing device according to claim 19, wherein the control means includes transmission means, the control means reading a value in the register of the electronic device to determine whether input/output means of the electronic device has both a function for data input/output by serial transfer and a function for data input/output by parallel transfer, and if the control means determines from the value that the input/output means of the electronic device has both a function for data input/output by serial transfer and a function for data input/output by parallel transfer, the transmission means transmits to the electronic device an instruction to execute the function for data input/output by serial transfer or to execute the function for data input/output by parallel transfer.

23. The information processing device according to claim 19, wherein the control means reads a value in the register of the electronic device to determine whether input/output means of the electronic device has both a function for data input/output by serial transfer and a function for data input/output by parallel transfer, and when the control means determines from the value that the input/output means of the electronic device has both a function for data input/output by serial transfer and a function for data input/output by parallel transfer:

the function for data input/output by serial transfer is executed in an initial state of the electronic device;

when the function for data input/output by parallel transfer is to be executed, a prescribed identification bit in a write area of the register is changed from an initial value; and when the function for data input/output by serial transfer is to be executed, the prescribed identification bit in the write area of the register is returned to the initial value.

24. The information processing device according to claim 19, wherein the electronic device includes a plurality of types of memory functions, and when a particular code indicating one of the memory function types is written at a prescribed address in the register, processing is performed according to the one of the memory function types.

25. An adapter device provided between an electronic device and an information processing device which performs data input and output with the electronic device, the adapter device comprising:

control means which reads a value setting in a register of the electronic device indicating a function of the electronic device, and which determines from a value in the register whether input/output means of the electronic device has both a function for data input/output by serial transfer and a function for data input/output by parallel transfer.

26. The adapter device according to claim 25, wherein when the value setting in the register of the electronic device indicates that the input/output means of the electronic device has only a function for data input/output by serial transfer, the control means recognizes the electronic device as a first electronic device, and when the value setting in the register of the electronic device indicates that the input/output means of the electronic device has both a function for data input/output by serial transfer and a function for data input/output by parallel transfer, the control means recognizes the electronic device as a second electronic device.

27. The adapter device according to claim 25, further comprising transmission means, wherein when the control means determines from the value in the register that the input/output means of the electronic device has both a function for data input/output by serial transfer and a function for data input/output by parallel transfer, the transmission means transmits to the electronic device an instruction to execute the function for data input/output by serial transfer or to execute the function for data input/output by parallel transfer.

28. The adapter device according to claim 25, wherein when the control means determines from the value in the register that the input/output means of the electronic device has both a function for data input/output by serial transfer and a function for data input/output by parallel transfer:

the function for data input/output by serial transfer is executed in an initial state of the electronic device, when the function for data input/output by parallel transfer is to be executed, a prescribed identification bit in a write area of the register is changed from an initial value, and when the function for data input/output by serial transfer is to be executed, the prescribed identification bit in the write area of the register is returned to the initial value.

29. The adapter device according to claim 25, further comprising:

an address conversion function which converts between logical addresses for data processing and physical addresses for memory functions of the electronic device, and when a prescribed code is written at a prescribed address in the register indicating that the electronic device includes the address conversion function, the address conversion function in the adapter device is rendered inactive.

30. The adapter device according to claim 25, wherein the electronic device includes a plurality of types of memory functions, and when a particular code indicating one of the memory function types is written at a prescribed address of the register, processing corresponding to the one of the memory function types is performed.

31. The adapter device according to claim 25, wherein when the setting in the register indicates that the electronic devices includes an address conversion function which converts between logical addresses for data processing and physical addresses for memory functions in the electronic device, the control means recognizes the electronic device as a first electronic device, and when the setting in the register indicates that the electronic device does not include the address conversion function, the control means recognizes the electronic device as a second electronic device.

32. An adapter device provided between an electronic device and an information processing device which performs data input and output with the electronic device, the adapter device comprising:

control means which reads a setting in a register of the electronic device indicating a function of the electronic device and which determines from a code in the register whether the electronic device has an address conversion function which converts between logical addresses for data processing and physical addresses for memory functions in the electronic device.

33. The adapter device according to claim 32, wherein when the code in the register of the electronic device indicates that the electronic device includes the address conversion function, the control means recognizes the electronic device as a first electronic device, and when the code in the register of the electronic device indicates that the electronic device does not include the address conversion function, the control means recognizes the electronic device as a second electronic device.

34. The adapter device according to claim 32, wherein the control means reads a value in the register of the electronic device and determines from the value whether input/output means of the electronic device has both a function for data input/output by serial transfer and a function for data input/output by parallel transfer, when the value in the register of the electronic device indicates that the input/output means of the electronic device has only a function for data input/output by serial transfer, the control means recognizes the electronic device as a first electronic device, and when the value in the register of the electronic device indicates that the input/output means of the electronic device has both a function for data input/output by serial transfer and a function for data input/output by parallel transfer, the control means recognizes the electronic device as a second electronic device.

35. The adapter device according to claim 32, wherein the control means includes transmission means, the control means reading a value in the register of the electronic device to determine whether input/output means of the electronic device has both a function for data input/output by serial transfer and a function for data input/output by parallel transfer, and if the control means determines from the value that the input/output means of the electronic device has both a function for data input/output by serial transfer and a function for data input/output by parallel transfer, the transmission means transmits to the electronic device an instruction to execute the function for data input/output by serial transfer or to execute the function for data input/output by parallel transfer.

36. The adapter device according to claim 32, wherein the control means reads a value in the register of the electronic device to determine whether input/output means of the electronic device has both a function for data input/output by serial transfer and a function for data input/output by parallel transfer, and when the control means determines from the value that the input/output means of the electronic device has both a function for data input/output by serial transfer and a function for data input/output by parallel transfer:

the function for data input/output by serial transfer is executed in an initial state of the electronic device;

when the function for data input/output by parallel transfer is to be executed, prescribed identification bit in a write area of the register is changed from an initial value; and when the function for data input/output by serial transfer is to be executed, the prescribed identification bit in the write area of the register is returned to the initial value.

37. The adapter device according to claim 32, wherein the electronic device includes a plurality of types of memory functions, and when a particular code indicating one of the memory function types is written at a prescribed address in the register, processing is performed according to the one of the memory function types.

38. An information exchange system, comprising:

an information processing device; and an electronic device detachably connectable to the information processing device, wherein the information processing device determines whether the electronic device includes a register having a write area, a read area, and a setting stored therein indicating the functions of the electronic device, when the electronic device does not include the register, the electronic device is recognized as a first electronic device having only memory functions, and when the electronic device includes the register, the electronic device is recognized as a second electronic device having memory functions and functions other than the memory functions, the other functions executable by the electronic device being identified based on the setting stored in the register, and when the electronic device includes the register, an instruction is transmitted from the information processing device to the electronic device to read the register, and a value stored in the register is read via input/output means in the electronic device to determine whether the input/output means has both a function for data input/output by serial transfer and a function for data input/output by parallel transfer.

39. The information exchange system according to claim 38, wherein, when the electronic device includes the register, an instruction is transmitted from the information processing device to the electronic device to execute the function for data input/output by serial transfer or to execute the function for data input/output by parallel transfer.

40. The information exchange system according to claim 38, wherein the function for data input/output by serial transfer is executed in an initial state of the electronic device, when the function for data input/output by parallel transfer is to be executed, a prescribed identification bit in a write area of the register is changed from an initial value, and when the function for data input/output by serial transfer is to be executed, the prescribed identification bit in the write area of the register is returned to the initial value.

41. The information exchange system according to claim 38, wherein the electronic device includes an address conversion function which converts between logical addresses for data processing and physical addresses for memory functions in the electronic device, and a prescribed code is stored at a predetermined address of the register indicating that the electronic device includes the address conversion function.

42. The information exchange system according to claim 38, wherein the information processing device includes an address conversion function which converts between logical addresses for data processing and physical addresses for memory functions in the electronic device, and a prescribed code is stored at a prescribed address of the register indicating that the electronic device includes the address conversion function.

43. The information exchange system according to claim 38, wherein the electronic device includes a plurality of types of memory functions, and when a particular code indicating one of the memory function types is stored at a prescribed address of the register, processing is performed according to the one of the memory function types.

44. The information exchange system according to claim 38, wherein the electronic device includes an address conversion function which converts between logical addresses for data processing and physical addresses for memory functions in the electronic device, and the value stored in the register indicates that the electronic device includes the function for data input/output by parallel transfer.

45. The information exchange system according to claim 38, wherein the information processing device includes an address conversion function which converts between logical addresses for data processing and physical addresses for memory functions in the electronic device, and when the value stored in the register indicates that the electronic device does not include the function for data input/output by parallel transfer, the address conversion function is used.

46. An information exchange system, comprising:

an information processing device; and an electronic device detachably connectable to the information processing device, the electronic device including control means which reads a setting in a register of the electronic device indicating a function of the electronic device, and which determines from a code in the register whether the electronic device includes an address conversion function which converts between logical addresses for data processing and physical addresses for the electronic device.

47. The information exchange system according to claim 46, wherein when code in the register indicates that the electronic device includes the address conversion function, the control means recognizes the electronic device as a first electronic device, and when the code in the register indicates that the electronic device does not include the address conversion function, the control means recognizes the electronic device as a second electronic device.

48. The information exchange system according to claim 46, wherein the control means reads a value in the register of the electronic device and determines from the value whether input/output means of the electronic device has both a function for data input/output by serial transfer and a function for data input/output by parallel transfer, if the value in the register of the electronic device indicates that the input/output means of the electronic device has only a function for data input/output by serial transfer, the control means recognizes the electronic device as a first electronic device, and if the value in the register of the electronic device indicates that the input/output means of the electronic device has both a function for data input/output by serial transfer and a function for data input/output by parallel transfer, the control means recognizes the electronic device as a second electronic device.

49. The information exchange system according to claim 46, wherein the control means includes transmission means, the control means reading a value in the register of the electronic device to determine whether input/output means of the electronic device has both a function for data input/output by serial transfer and a function for data input/output by parallel transfer, and if the control means determines from the value that the input/output means of the electronic device has both a function for data input/output by serial transfer and a function for data input/output by parallel transfer, the transmission means transmits to the electronic device an instruction to execute the function for data input/output by serial transfer or to execute the function for data input/output by parallel transfer.

50. The information exchange system according to claim 46, wherein the control means reads a value in the register of the electronic device to determine whether input/output means of the electronic device has both a function for data input/output by serial transfer and a function for data input/output by parallel transfer, and if the control means determines from the value that the input/output means of the electronic device has both a function for data input/output by serial transfer and a function for data input/output by parallel transfer:

the control means executes the function for data input/output by serial transfer in an initial state of the electronic device;

when the function for data input/output by parallel transfer is to be executed, the control means changes a prescribed identification bit in a write area of the register from an initial value; and when the function for data input/output by serial transfer is to be performed, the control means returns the prescribed identification bit in the write area of the register to the initial value.

51. The information exchange system according to claim 46, wherein the electronic device includes a plurality of types of memory functions, and when a particular code indicating one of the memory function types is written at a prescribed address in the register, processing is performed corresponding to the one of the memory function types.

52. An information exchange system, comprising:

an information processing device;

an electronic device detachably connectable to the information processing device; and an adapter device, wherein the information processing device determines whether the electronic device includes a register having a write area, a read area and a setting stored therein indicating the functions of the electronic device, when the electronic device does not include the register, the electronic device is recognized as a first electronic device having only memory functions, and when the electronic device includes the register, the electronic device is recognized as a second electronic device having memory functions and functions other than the memory functions, the other functions executable by the electronic device being identified based on the setting stored in the register, and when the electronic device includes the register, an instruction is transmitted from the information processing device to the electronic device to read the register, and a value stored in the register is read via input/output means in the electronic device to determine whether the input/output means has both a function for data input/output by serial transfer and a function for data input/output by parallel transfer.

53. The information exchange system according to claim 52, wherein when the electronic device includes the register, an instruction is transmitted from the information processing device to the electronic device to execute the function for data input/output by serial transfer or to execute the function for data input/output by parallel transfer.

54. The information exchange system according to claim 52, wherein the function for data input/output by serial transfer is executed in an initial state of the electronic device, when the function for data input/output by parallel transfer is to be executed, a prescribed bit in a write area of the register is changed from an initial value, and when the function for data input/output by serial transfer is to be performed, the prescribed identification bit in the write area of the register is returned to the initial value.

55. The information exchange system according to claim 52, wherein the electronic device includes an address conversion function which converts between logical addresses for data processing and physical addresses for memory functions in the electronic device, and prescribed code is stored at a predetermined address of the register indicating that the electronic device includes the address conversion function.

56. The information exchange system according to claim 52, wherein the information processing device includes an address conversion function which converts between logical addresses for data processing and physical addresses for memory functions in the electronic device, and when a prescribed code is stored at a prescribed address the register indicating that the electronic device includes the address conversion function, the address conversion function in the information processing device is rendered inactive.

57. The information exchange system according to claim 52, wherein the adapter device includes an address conversion function which converts between logical addresses for data processing and physical addresses for memory functions in the electronic device, and when a prescribed code is written at a prescribed address the register indicating that the electronic device has the address conversion function, the address conversion function in the adapter device is rendered inactive.

58. The information exchange system according to claim 52, wherein the electronic device includes a plurality of types of memory functions, and when a particular code is written at a prescribed address of the register indicating one of the memory function types, processing is performed corresponding to the one of the memory function types.

59. The information exchange system according to claim 52, wherein the electronic device includes an address conversion function which converts between logical addresses for data processing and physical addresses for memory functions in the electronic device, and when a prescribed value indicating that the electronic device includes the function for data input/output by parallel transfer is stored at a predetermined address in the register, address conversion function is employed.

60. The information exchange system according to claim 52, wherein the information processing device includes an address conversion function which converts between logical addresses for data processing and physical addresses for memory functions in the electronic device, and when a prescribed value indicating that the electronic device includes the function for data input/output by parallel transfer is not stored at a prescribed address of the register, the address conversion function is employed.

61. The information exchange system according to claim 52, wherein the adapter device includes an address conversion function which converts between logical addresses for data processing and physical addresses for memory functions in the electronic device, and when a prescribed value indicating that the electronic device includes the function for data input/output by parallel transfer is not stored at a prescribed address of the register, the address conversion function in the adapter device is employed.

62. An information exchange system, comprising:

an information processing device;

an electronic device detachably connectable to the information processing device; and an adapter device having control means which reads a setting in a register of the electronic device indicating a function of the electronic device, and which determines from a code in the register whether the electronic device includes an address conversion function which converts between logical addresses for data processing and physical addresses in the electronic device.

63. The information exchange system according to claim 62, wherein when the code in the register indicates that the electronic device includes the address conversion function, the control means recognizes the electronic device as a first electronic device, and when the code in the register indicates that the electronic device does not include the address conversion function, the control means recognizes the electronic device as a second electronic device.

64. The information exchange system according to claim 62, wherein the control means reads a value in the register of the electronic device to determine whether input/output means of the electronic device has both a function for data input/output by serial transfer and a function for data input/output by parallel transfer, if the value in the register of the electronic device indicates that the input/output means of the electronic device has only a function for data input/output by serial transfer, the control means recognizes the electronic device as a first electronic device, and if the value in the register of the electronic device indicates that the input/output means of the electronic device has both a function for data input/output by serial transfer and a function for data input/output by parallel transfer, the control means recognizes the electronic device as a second electronic device.

65. The information exchange system according to claim 62, wherein the control means includes transmission means, the control means reading a value in the register of the electronic device to determine whether input/output means of the electronic device has both a function for data input/output by serial transfer and a function for data input/output by parallel transfer, and if the control means determines from the value that the input/output means of the electronic device has both a function for data input/output by serial transfer and a function for data input/output by parallel transfer, the transmission means transmits to the electronic device an instruction to execute the function for data input/output by serial transfer or to execute the function for data input/output by parallel transfer.

66. The information exchange system according to claim 62, wherein the control means reads a value in the register of the electronic device to determine whether input/output means of the electronic device has both a function for data input/output by serial transfer and a function for data input/output by parallel transfer, and if the control means determines from the value that the input/output means of the electronic device has both a function for data input/output by serial transfer and a function for data input/output by parallel transfer:

the function for data input/output by serial transfer is executed in an initial state of the electronic device;

when the function for data input/output by parallel transfer is to be executed, a prescribed identification bit in a write area of the register is changed from an initial value; and when the function for data input/output by serial transfer is to be performed, the prescribed identification bit in the write area of the register is returned to the initial value.

67. The information exchange system according to claim 62, wherein the electronic device includes a plurality of types of memory functions, and when a particular code is stored at a prescribed address of the register indicating one of the memory function types, processing is performed corresponding to the one of the memory function types.

* * * * *

UNITED STATES PATENT AND TRADEMARK OFFICE
CERTIFICATE OF CORRECTION

PATENT NO. : 6,944,703 B2
DATED : September 13, 2005
INVENTOR(S) : Takumi Okaue and Junko Sasaki It is certified that error appears in the above-identified patent and that said Letters Patent is hereby corrected as shown below:

Column 31,
Line 31, insert -- a -- before "register", (first occurrence).

Column 39,
Line 5, insert -- the -- after "when".

Column 40,
Line 55, insert -- a -- before "prescribed".

Column 41,
Line 24, insert -- the -- before "address".

Signed and Sealed this

Sixth Day of December, 2005

JON W. DUDAS
*Director of the United States Patent and Trademark Office*